(12) United States Patent
Itoh et al.

(10) Patent No.: US 7,184,260 B2
(45) Date of Patent: Feb. 27, 2007

(54) ELECTRONIC APPARATUS

(75) Inventors: Katsunori Itoh, Kawasaki (JP);
Masahiko Kyouzuka, Kawasaki (JP);
Masahiko Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 10/927,642

(22) Filed: Aug. 27, 2004

(65) Prior Publication Data

US 2005/0128693 A1 Jun. 16, 2005

(30) Foreign Application Priority Data

Dec. 15, 2003 (JP) .............................. 2003-417157

(51) Int. Cl.
*G06F 1/16* (2006.01)
(52) U.S. Cl. ..................................... 361/681
(58) Field of Classification Search ................. 361/681
See application file for complete search history.

(56) References Cited

U.S. PATENT DOCUMENTS

| 5,379,182 | A | 1/1995 | Fujimori et al. |
| 5,923,870 | A | 7/1999 | Johns et al. |
| 6,144,360 | A | 11/2000 | Evanicky et al. |
| 6,381,124 | B1 | 4/2002 | Whitcher et al. |
| 6,426,872 | B1 | 7/2002 | Sutton et al. |
| 6,501,644 | B1 | 12/2002 | Silverman et al. |
| 6,560,092 | B2 | 5/2003 | Itou et al. |
| 6,618,240 | B1 | 9/2003 | Kim |
| 6,914,773 | B2 * | 7/2005 | Yang et al. ................. 361/681 |
| 2001/0048586 | A1 | 12/2001 | Itou et al. |
| 2002/0159227 | A1 | 10/2002 | Sasaki et al. |
| 2003/0048598 | A1 | 3/2003 | Lee et al. |
| 2003/0132918 | A1 | 7/2003 | Fitch et al. |

FOREIGN PATENT DOCUMENTS

| CN | 1489018 A | 4/2004 |
| DE | 203 01 608 U1 | 4/2003 |
| DE | 203 05 883 U1 | 6/2003 |
| EP | 0 831 388 A1 | 3/1998 |
| EP | 0 917 036 A2 | 5/1999 |
| JP | 05-150224 | 6/1993 |
| JP | 06-236669 | 8/1994 |
| JP | 2001-502103 | 2/2001 |
| JP | 2001-337743 | 12/2001 |
| JP | 2003-167231 | 6/2003 |
| WO | WO 99/06902 | 2/1999 |

* cited by examiner

*Primary Examiner*—Yean-Hsi Chang
(74) *Attorney, Agent, or Firm*—Arent Fox PLLC

(57) ABSTRACT

The present invention provides a small and thin electronic apparatus such as a tablet PC, which has a screen and an information processing function including an image display processing function for the screen. In the apparatus, a front cover is fixed to a LCD unit by screw-on fastening members, and a rear cover is fixed to the LCD unit by inserting screws through the screw-on fastening members into screw holes provided at positions where the screw holes overlap the LCD unit.

17 Claims, 22 Drawing Sheets

ELECTRONIC APPARATUS

BACKGROUND OF THE INVENTION

1. Field of the Invention

The present invention relates to an electronic apparatus having a screen.

2. Description of the Related Art

Recently, a pen personal computer known as a tablet personal computer (referred to as a "tablet PC" hereinafter) has been designed and introduced as a product.

A tablet PC is square and flat in shape, and it has a large screen for accepting user input by detecting a point touched by or approached by a pen.

A tablet PC generally has a three-layer structure in which a display panel such as a LCD panel is disposed between a front cover and a rear cover.

Japanese Patent Application Laid-Open No. 5-150224, shows an example of a unit having a three-layer structure, which is not a tablet PC but a display panel unit. In this structure, a LCD unit is firmly fixed to an inner cover together with fixing metallic parts and then an outer cover is firmly fixed to it. According to a technique proposed in this document, merely removing the outer cover allows the entire rear surface of the LCD unit to appear and thus its maintenance is easy.

A tablet PC has been developed to realize user input such as user input by means of a pen, onto which a user inputs information while holding it in his hand. It is desired to enlarge the screen of the tablet PC so as to increase an amount of information to be displayed and to improve usability, while it is desired to miniaturize the tablet PC itself for portability. The flat surface of the tablet PC having a screen thereon cannot be smaller than the screen. Thus, it is desired to miniaturize the tablet PC so that the screen is enlarged as far to the edge of the flat surface of the tablet PC as possible and an area surrounding the screen on the flat surface of the tablet PC is formed as small as possible. Also, it is desired to form the flat surface of the tablet PC as small as possible in thickness.

For example, a flat surface of the display panel unit shown in Japanese Patent Application Laid-Open No. 5-150224 mentioned above has a wide area that surrounds the screen and there is found no effort to miniaturize the panel in terms of the desires described above.

SUMMARY OF THE INVENTION

In view of the foregoing, it is an object of the present invention to provide a thin and small electronic apparatus such as tablet PC.

In order to achieve the above object, the present invention provides a first electronic apparatus having:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, the electronic apparatus including:

a fastening member that has a first hole via which the fastening member is fixed to a periphery of the display panel, a second hole via which the fastening member is fixed to the first cover, and a third hole via which the fastening member is fixed to the second cover, wherein the fastening member has the third hole at a position where the third hole overlaps the display panel when the fastening member is fixed to the display panel via the first hole.

In the first electronic apparatus, it is preferable that the third hole is a screw hole, and the second cover is fixed to the fastening member by a screw inserted into the screw hole.

In order to achieve the above object, the present invention provides a second electronic apparatus having:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, the electronic apparatus including:

an fastening member that has a fourth hole via which the fastening member is fixed to the first cover, and a fifth hole via which the fastening member is fixed to the second cover, wherein the fastening member has the fifth hole at a position where the fifth hole overlaps the display panel when the display panel is fixed to the first cover and the fastening member is fixed to the first cover.

In the second electronic apparatus, it is preferable that the fifth hole is a screw hole, and the second cover is fixed to the fastening member by a screw inserted into the screw hole.

In order to achieve the above object, the present invention provides a third electronic apparatus having:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, wherein:

the second cover is provided with an opening and includes:

a box-shaped plate member that has an open space in a center of a bottom thereof and is fit into the opening so as to be supported by an edge of the opening; and a disk unit that drives a disk type of recording medium and is disposed in the opening in such a manner that the disk unit is fit into the plate member and supported by a periphery of the bottom of the plate member.

In the third electronic apparatus, the disk unit includes a hard disk therein and drives the hard disk.

In order to achieve the above object, the present invention provides a fourth electronic apparatus having:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, the electronic apparatus including:

a power converter that coverts, upon receipt of power, the power into power to be supplied to the display panel, wherein the power converter is fixed to the first cover and disposed at a position where the power converter overlaps the display panel.

In the fourth electronic apparatus, the display panel includes a function of accepting pen input by detecting a position touched by or approached by a pen, wherein the electronic apparatus comprises a pen case that is fixed to the first cover and disposed at a position where the pen case overlaps a rear surface of the display panel, and wherein the power converter is fixed to the pen case and fixed to the first cover via the pen case.

In the fourth electronic apparatus, the power converter is an inverter that supplies power for backlighting the screen.

In the first and the second electronic apparatus, the fastening member is a hardware member. The first through fourth electronic apparatus have an information processing function including an image display processing function for the screen.

In order to achieve the above object, the present invention provides a fifth electronic apparatus having:

a plate-shaped display panel that has a screen on a front surface thereof;

a first cover that has a display window at a position facing the screen and covers one surface of the display panel; and a second cover that has an information processing function including an image display processing function for the screen and covers the other surface of the display panel so as to house the display panel in cooperation with the first cover, the electronic apparatus including:

a fastening member that has a first hole via which the fastening member is fixed to a periphery of the display panel, a second hole via which the fastening member is fixed to the first cover, and a third hole via which the fastening member is fixed to the second cover, wherein the second cover is fixed to the fastening member by a screw via the third hole.

In order to achieve the above object, the present invention provides a sixth electronic apparatus having:

a plate-shaped display panel that has a screen on a front surface thereof;

a first cover that has a display window at a position facing the screen and covers one surface of the display panel; and a second cover that has an information processing function including an image display processing function for the screen and covers the other surface of the display panel so as to house the display panel in cooperation with the first cover, the electronic apparatus including:

a fastening member that has a first hole via which the fastening member is fixed to a periphery of the display panel, a second hole via which the fastening member is fixed to the first cover, and a third hole via which the fastening member is fixed to the second cover, wherein the fastening member has the third hole at a position where the third hole overlaps a square area including the display panel and the fastening member when the fastening member is fixed to the display panel via the first hole.

In order to achieve the above object, the present invention provides a seventh electronic apparatus having:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, the electronic apparatus including:

a fastening member that has a fourth hole via which the fastening member is fixed to the first cover, and a fifth hole via which the fastening member is fixed to the second cover, wherein the fastening member has the fifth hole at a position where the fifth hole overlaps a square area including the display panel and the fastening member when the display panel is fixed to the first cover and the fastening member is fixed to the first cover.

According to the first electronic apparatus of the present invention, the fastening member having the first through third holes has the third hole at a position where the third hole overlaps the display panel, and thus the second cover is fixed to the fastening member in a position where the second cover overlaps the display panel. Accordingly, it is possible to make the area around the flat surface of the display panel small, which contributes to miniaturization of the electronic apparatus. According to the second electronic apparatus of the present invention, when the fastening member having the fourth and fifth holes is used, the second cover can be firmly fixed by screws.

Also, according to the third electronic apparatus of the present invention, the plate member can be made of thin plate and functions as a kind of cushion material. Thus, it is possible to use extremely thin cushion materials that need to be arranged around the disk unit and are usually thick, which contributes to making this electronic apparatus small in thickness.

Further, according to the fourth electronic apparatus of the present invention, the power converter that is necessary to power supply for the display panel is disposed on the back of the display panel so as to overlap the display panel. Thus, the area around the flat surface of the display panel can be smaller than an apparatus of which a display panel and a power converter are arranged side by side. This also contributes to miniaturization of this electronic apparatus.

Furthermore, according to the fifth electronic apparatus of the present invention, since the above-described fastening member to which the second cover is fixed is provided, there is no need for the first cover to have a large boss that is used to attach a rear cover to a front cover as required by a conventional technique. This allows a frame to become small and contributes to miniaturization of the apparatus.

Furthermore, according to the sixth and seventh electronic apparatus of the present invention, the fastening member has a hole for fixing itself to the second cover and the hole is provided in a square area including the display panel and the fastening member, which also allows the frame to become small and contributes to miniaturization of the electronic apparatus.

DETAILED DESCRIPTION OF PREFERRED EMBODIMENTS

Hereinafter, embodiments of the present invention will be described.

Figure 1:
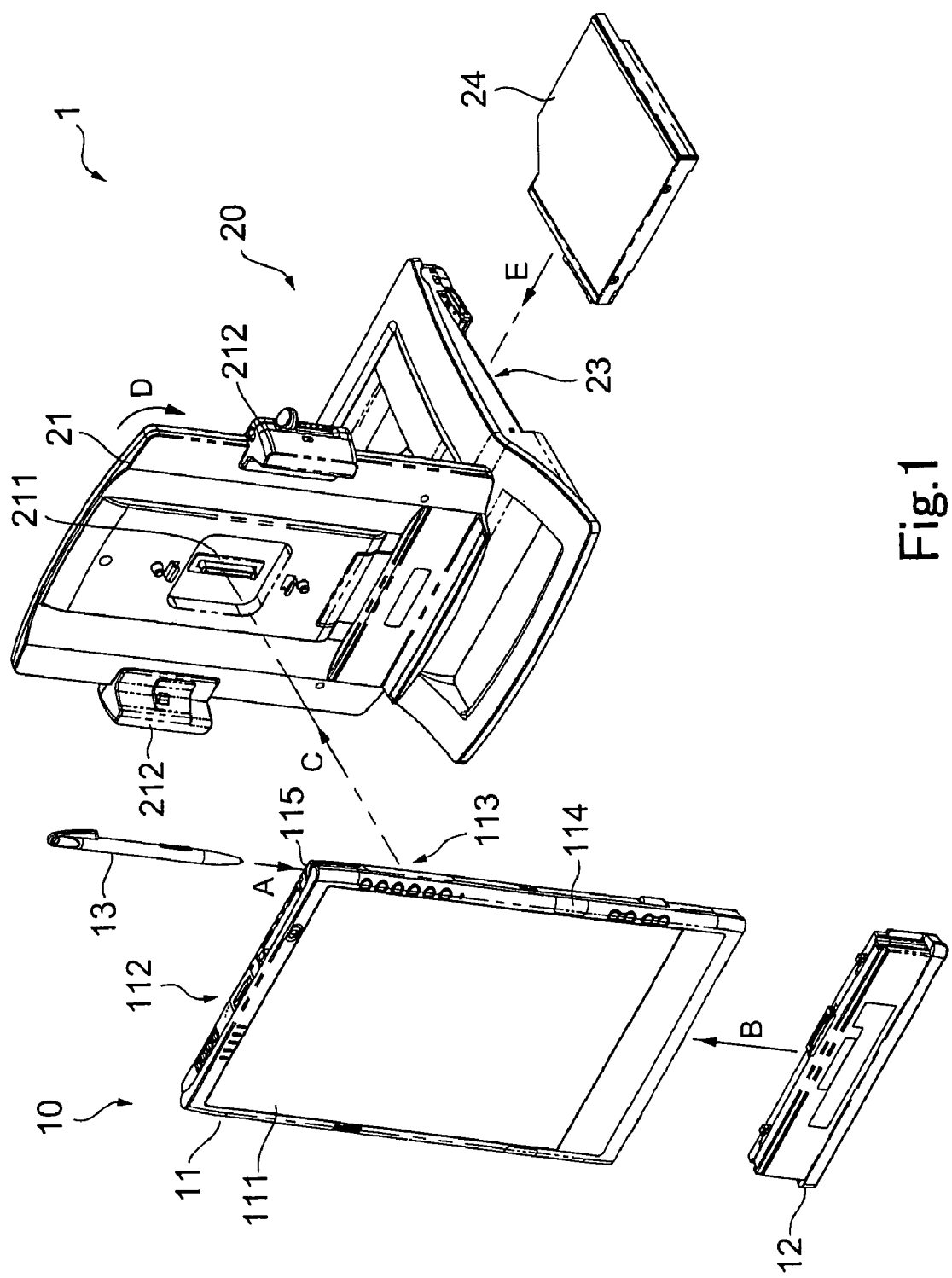
FIG. 1 is an exploded perspective view showing a structure of a PC system including a tablet PC according to one embodiment of the present invention.

FIG. 1 is an exploded perspective view showing an entire structure of a PC system 1 including a tablet PC 10 according to one embodiment of the present invention.

The PC system 1 is comprised of the tablet PC 10 and a docking unit 20.

The tablet PC 10 is comprised of a main unit 11, a battery unit 12, and a pen 13. All the front surface of the main unit 10 is occupied by a display 111 except for a frame portion surrounding the display 111. The frame portion has various types of I/O connectors 112 and operating buttons 113. The frame portion also has an infrared communications portion 114 used for infrared communications with a wireless keyboard and a wireless microphone (not shown). Further, the frame portion is provided with a pen opening 115 through which a pen 13 is inserted. The main unit 11 contains therein a pen case (as will be described later) that is disposed behind the pen opening 115. The pen 13 is inserted into the pen case in the direction shown by an arrow A through the opening 115 so as to be contained in the main unit 11.

The battery unit 12 is connected to the main unit 11 in the direction shown by an arrow B and thus the main unit 11 is capable of operating by receiving power from the battery unit 12.

A user pulls the pen 13 from the pen case when he wants to use it and touches the screen 111 with its tip to input information. The tablet PC 10 is configured to detect a coordinate of a point touched by the pen 13 on the screen 111 through electromagnetic induction between the pen 13 and the main unit 11. An operating system (OS) is installed on the tablet PC, which is suitable for input operations by a user who inputs various kinds of information and orders into the tablet PC 10 by rubbing the tip of the pen 13 against the screen 111. When inputting complicated information etc., a keyboard can be displayed on the screen so that a user can input information by touching keys thereon with the tip of the pen.

The tablet PC 10 is detachably supported by the docking unit 20 and thus the screen of the tablet PC 10 can be used like a display of an ordinary type of personal computer when the tablet PC 10 is obliquely and firmly set on the docking unit 20. When the tablet PC 10 is firmly set on the docking unit 20 and a wireless keyboard and a wireless mouse (not shown) are prepared, the tablet PC 10 can be used like an ordinary type of personal computer.

Figure 10:
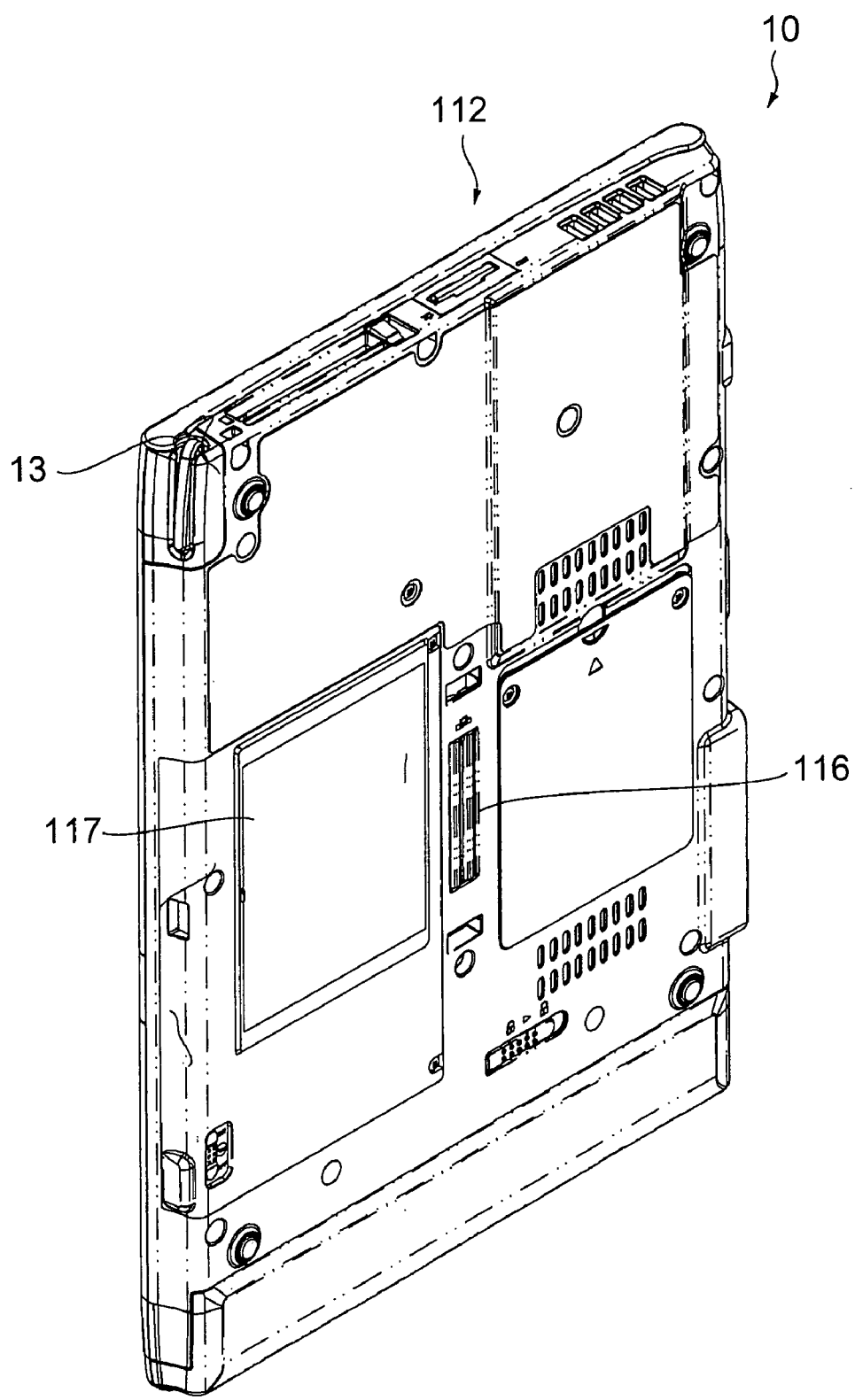
FIG. 10 is a view showing the rear surface of the tablet PC shown in FIG. 1.

The docking unit 20 has a support portion 21 for supporting the tablet PC 10, and the support portion 21 has a connector 211 to be connected to a connector 116 (see FIG. 10) provided on the rear surface of the tablet PC 10. Also, on both sides of the support portion 21, holding portions 212 for holding the sides of the tablet PC 10 are provided. When the tablet PC 10 is connected to the docking unit 20 via the support portion 21 in the direction shown by an arrow C, the connector 116 disposed on the back of the tablet PC 10 and the connector 211 of the support portion 21 are connected and the tablet PC 10 is held by the holding portions 212 at the sides. The tablet PC 10 and the support portion 21 are thus firmly connected so as to become one unit. The support portion 21 can be turned by 90 degrees in the direction shown by an arrow D and thus the screen of tablet PC 1Q that is portrait as shown in FIG. 10 can be used as a landscape screen.

The docking unit 20 has a concave portion 23 in which a drive unit 24, such as a CD-ROM drive unit, a CD-R drive unit, a DVD drive unit selected by a user when necessary, is fit in the direction shown by an arrow E.

The feature of the present embodiment resides in the tablet PC 10 of the PC system 1 shown in FIG. 1 and thus the tablet PC 10 will be described in detail hereinafter.

Figure 2:
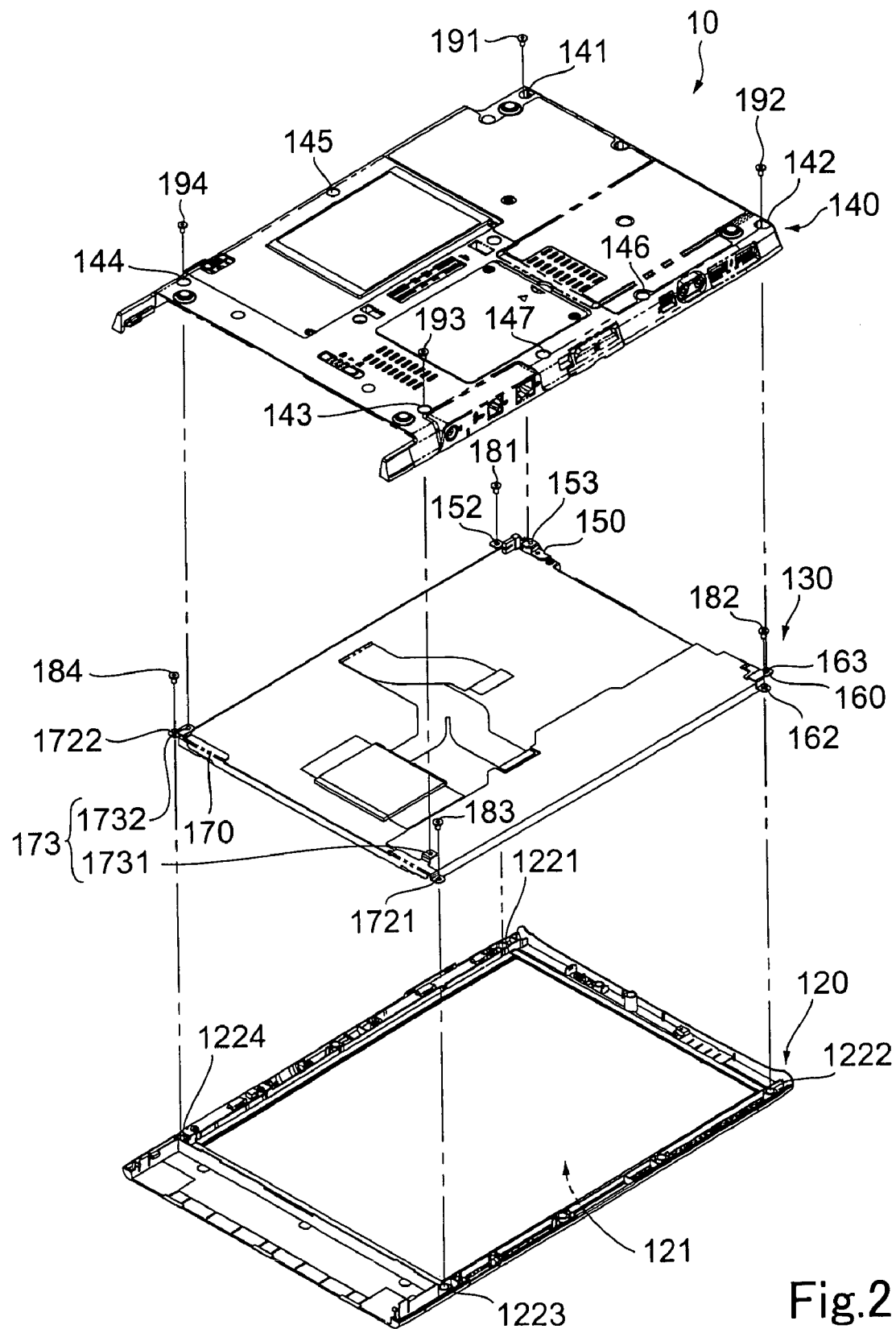
FIG. 2, is an exploded perspective view of the tablet PC shown in FIG. 1.

FIG. 2 is an exploded perspective view of the tablet PC 10 shown in FIG. 1.

The tablet PC 10 has a three-layer structure composed of a front cover 120, a LCD unit 130, and a rear cover 140 indicated in this order from the bottom in FIG. 2.

The front cover 120 is occupied by a display window 121 in the center except for the frame portion surrounding the display window 121, and a transparent plastic plate is fit in the display window 121. The front is cover 120 is to cover the front surface of the LCD unit 130.

Figure 3:
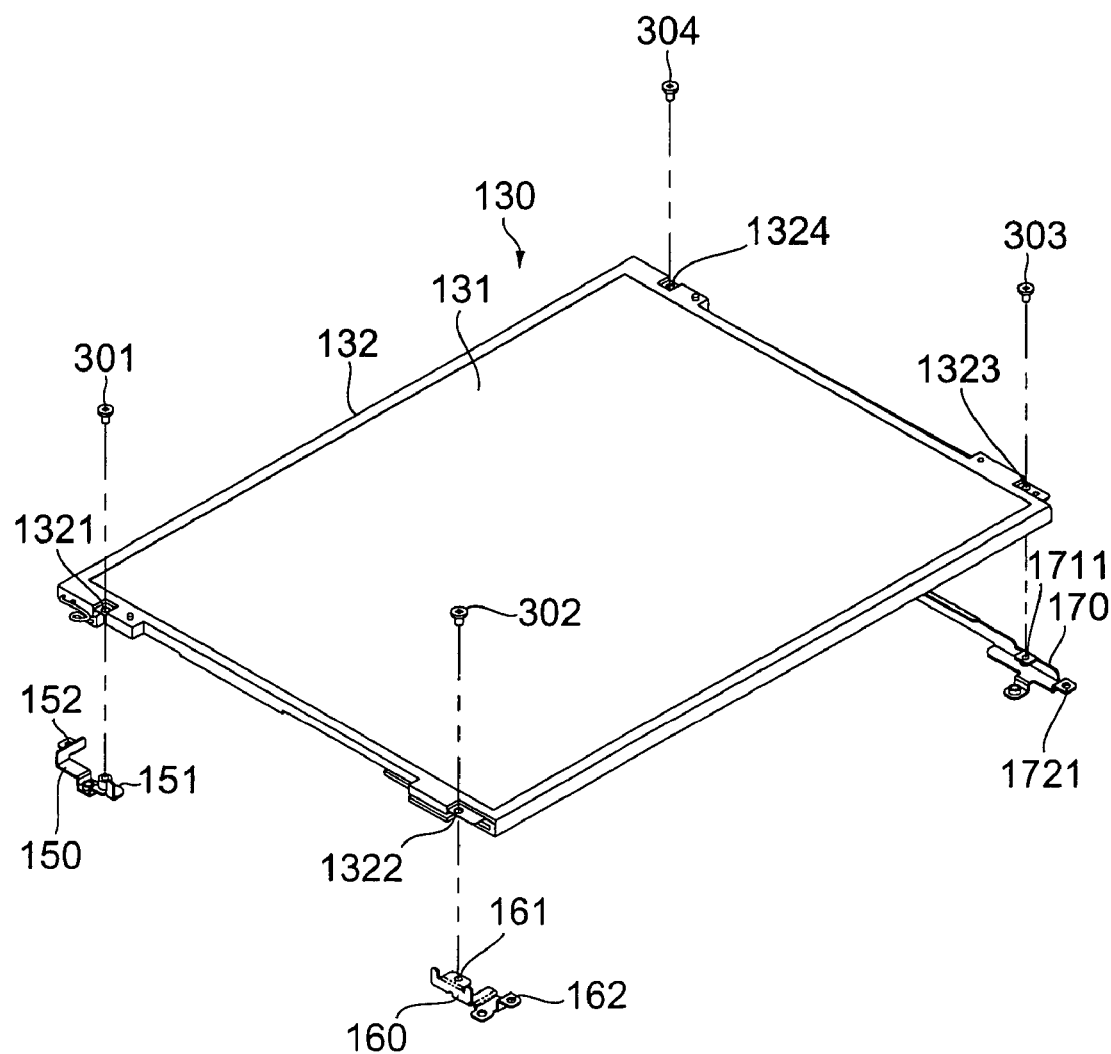
FIG. 3 is an exploded perspective view showing positions on a LCD unit at which screw-on hardware members are fixed.

The LCD unit 130 is a display panel shaped like a plate, and its rear surface is shown in FIG. 2. As shown in FIG. 3, most of the front surface of the LCD unit 130 is occupied by a display screen 131 that is framed by a frame 132. Images are displayed on the display screen 131.

The rear cover 140 covers the back surface of the LCD unit 130 s 0 as to house the LCD unit 130 in cooperation with the front cover 120. The rear cover 140 has the function as a computer such as a CPU etc. and carries out various kinds of information processing including processing for displaying images on the display screen 131 (see FIG. 3) of the LCD unit 130.

The LCD unit 130 has three screw-on hardware members 150, 160, and 170 being fixed thereto. The LCD unit 130 is fixed by screws 181, 182, 183 and 184 to the front cover 120 via the screw-on hardware members 150, 160 and 170. The rear cover 140 is provided with concave portions 141, 142, 143, and 144 each having a clear hole for a screw and hiding the screw head. The rear cover 140 is fixed by screws 191, 192, 193, and 194 via the screw-on hardware members 150, 160, and 170 to the LCD unit 130 to which the front cover 120 has been fixed. The concave portions 141, 142, 143, and 144 hide the heads of the screws 191, 192,193, and 194 in this state.

The rear cover 140 is also provided with three other concave portions 145, 146 and 147 similar to the concave portions 141, 142, 143 and 144, which will be described later.

Figure 4:
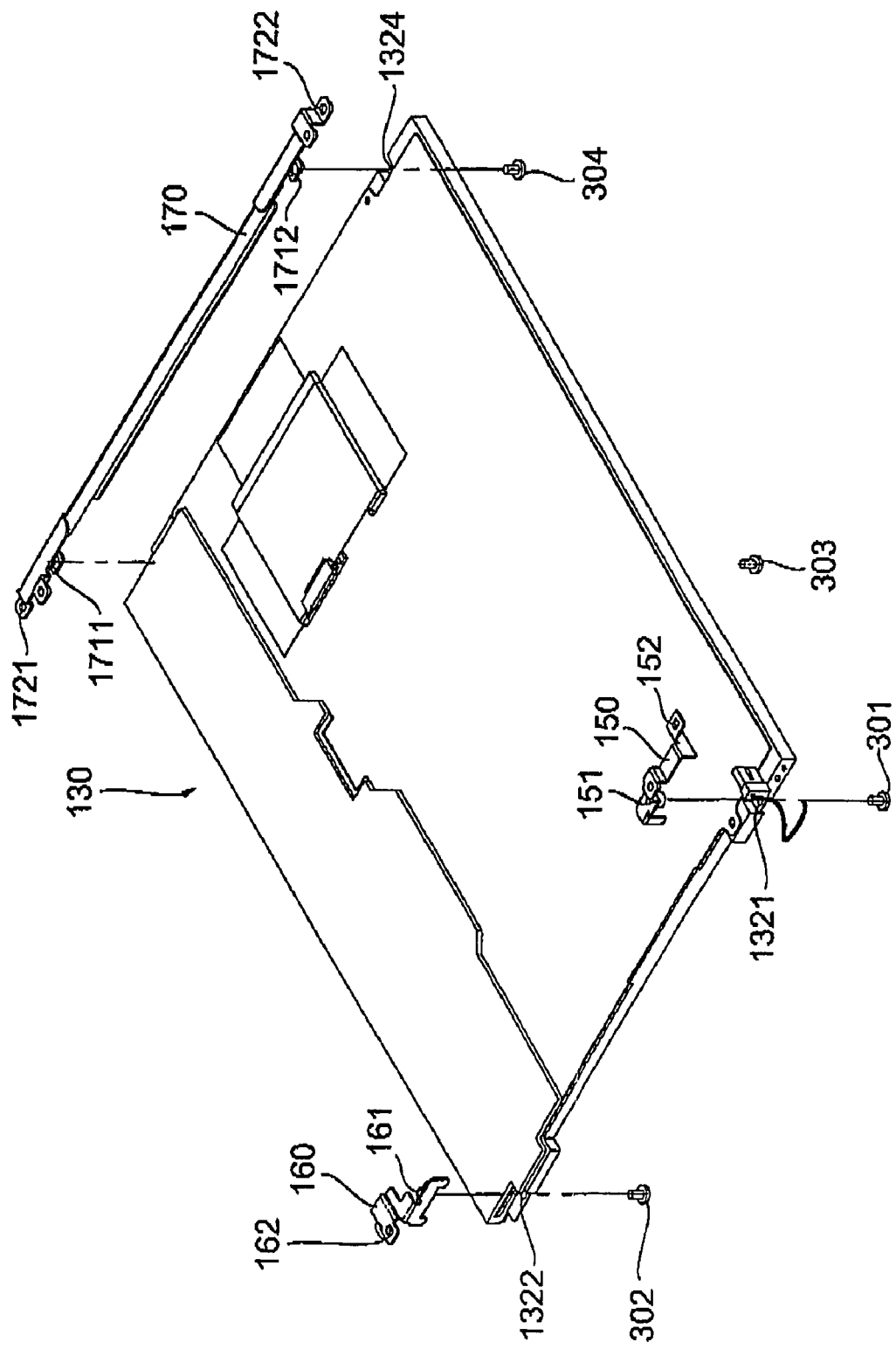
FIG. 4 is an exploded perspective view showing positions of a LCD unit at which screw-on hardware members are fixed.

FIGS. 3 and 4 are perspective views each showing the LCD unit 130 with positions to which the screw-on hardware members 150, 160 and 170 are fixed.

FIG. 3 shows the front surface and FIG. 4 shows the rear surface of the LCD unit 130.

Figure 5:
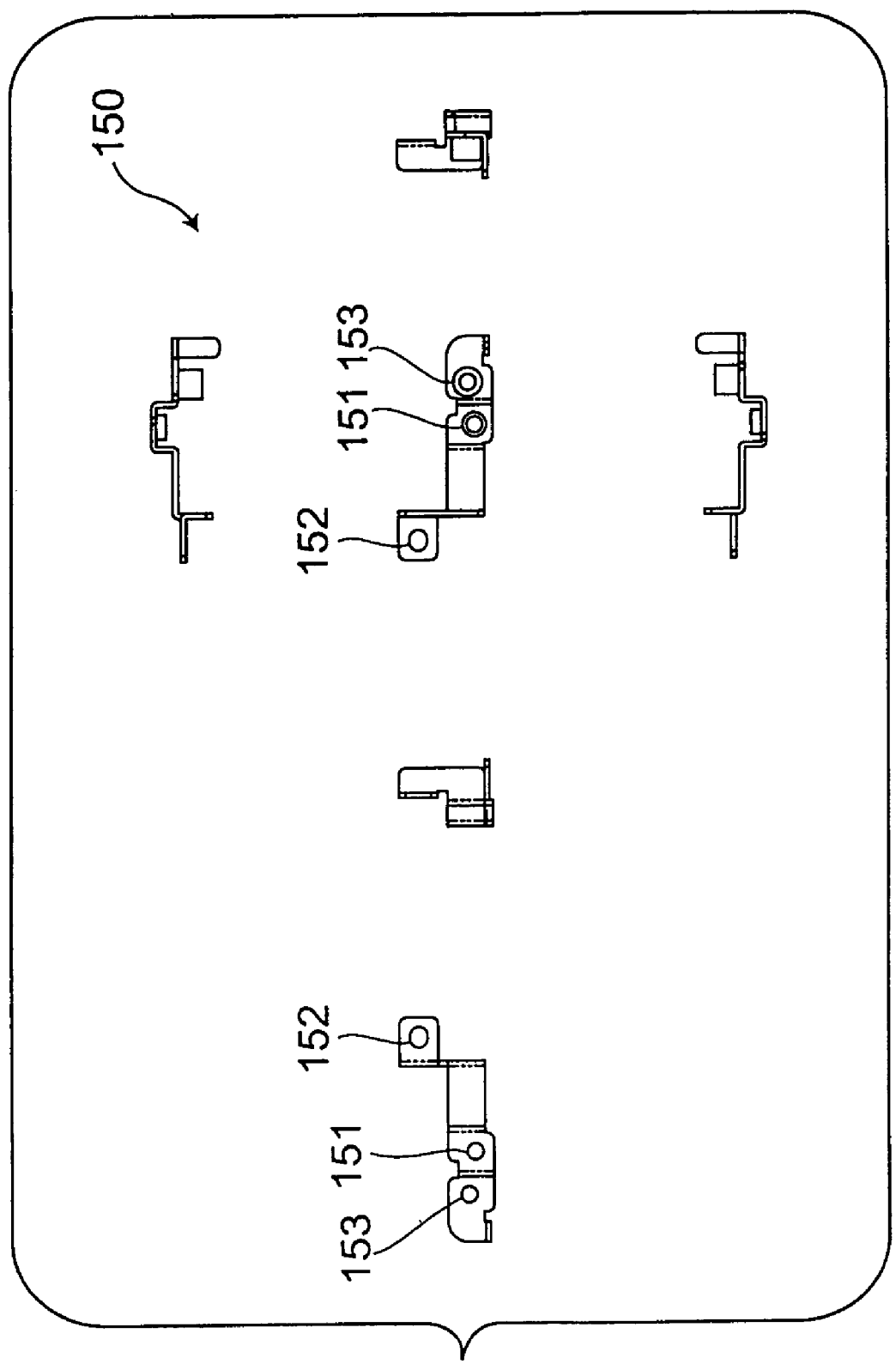
FIG. 5 is a six-view drawing of a screw-on hardware member.
Figure 6:
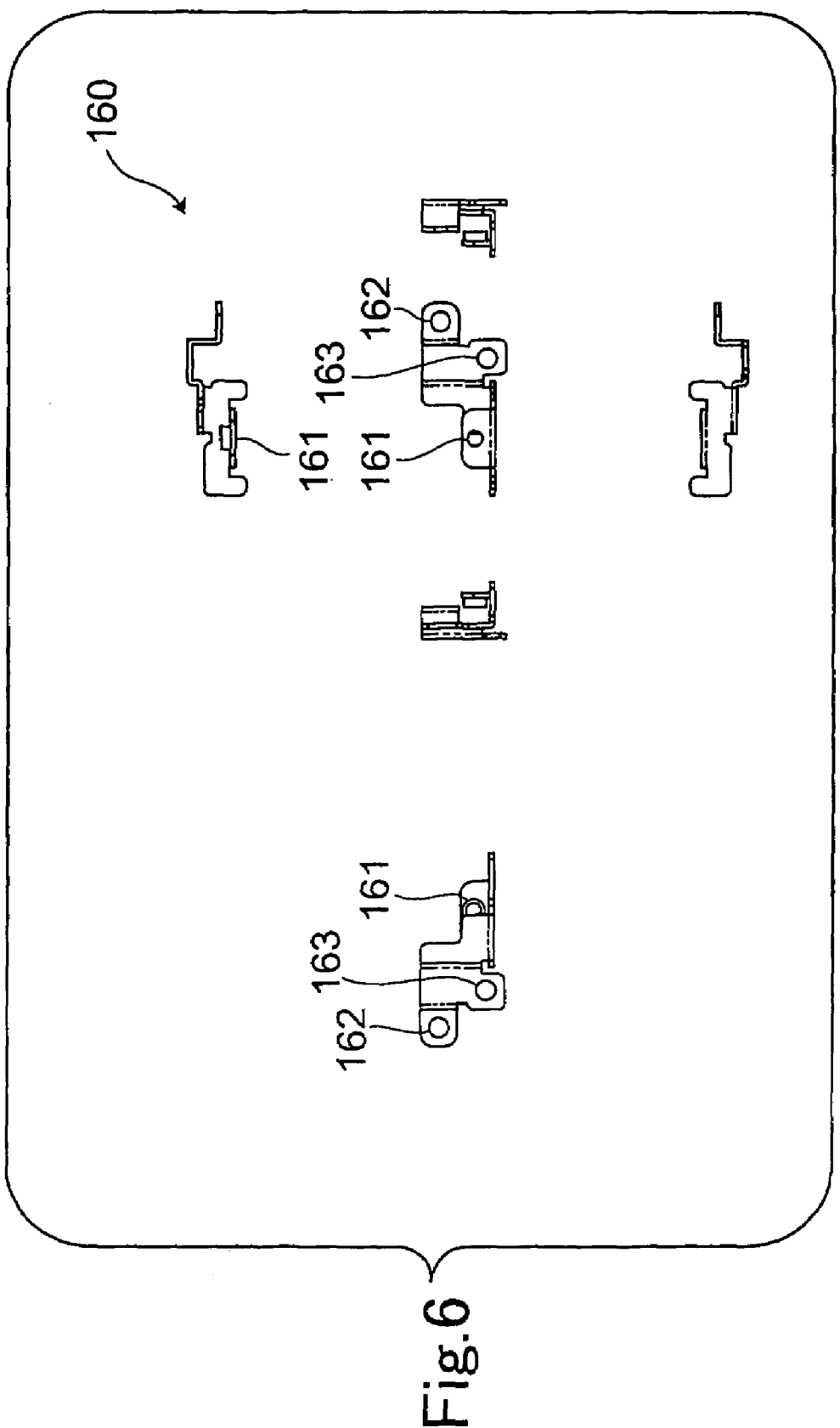
FIG. 6 is a six-view drawing of a screw-on hardware member.
Figure 7:
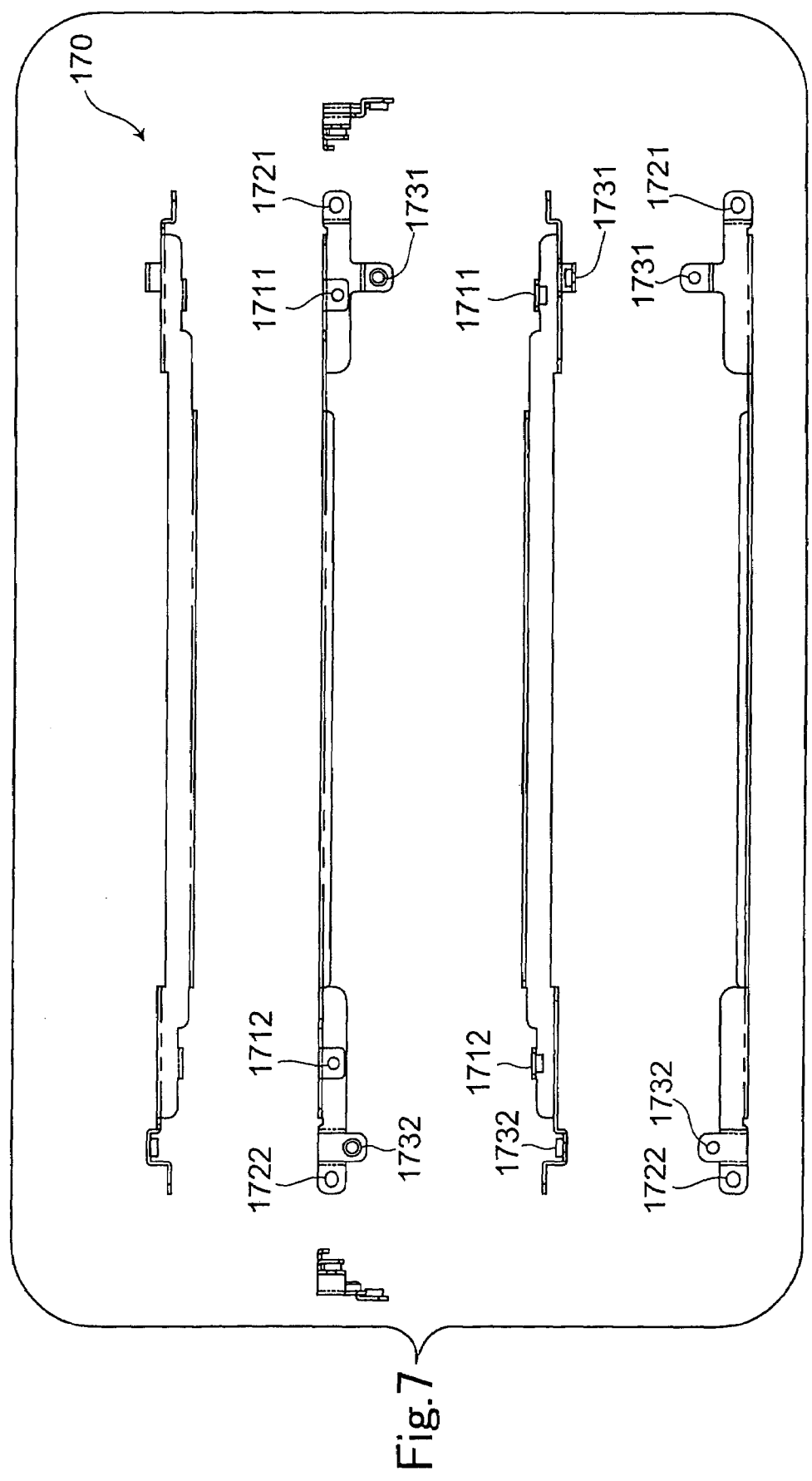
FIG. 7 is a six-view drawing of a screw-on hardware member.

FIGS. 5, 6, and 7 are the respective six-view drawings of the screw-on hardware members 150, 160 and 170 shown in FIGS. 3 and 4.

The frame 132 of the LCD unit 130 has clear holes 1321, 1322, 1323 and 1324 for screws 301, 302, 303 and 304 to pass through them. Specifically, the screw 301 is put through the clear hole 1321 and inserted into a screw hole 151 of the screw-on hardware member 150, the screw 302 is put through the clear hole 1322 and inserted into a screw hole 161 of the screw-on hardware member 160, and the screws 303 and 304 are put through the clear holes 1323 and 1324 and inserted into screw holes 1711 and 1712 (see FIG. 4) of the screw-on hardware member 170, respectively. The three screw-on hardware members 150, 160 and 170 are thus secured to the LCD unit 130.

Subsequently, by means of the screw-on hardware members 150, 160 and 170 thus secured to the LCD unit 130, the LCD unit 130 is fixed to the front cover 120.

As shown in FIG. 2, the LCD unit 130 is fixed to the front cover 120 in the following manner. The screw 181 is put through a clear hole 152 of the screw-on hardware member 150 that has been secured to the LCD unit 130 and inserted into a screw hole 1221 of the front cover 120. The screw 182 is put through a clear hole 162 of the screw-on hardware member 160 that has been secured to the LCD unit 130 and inserted into a screw hole 1222 of the front cover 120. The screws 183 and 184 are put through clear holes 1721 and 1722 of the screw-on hardware member 170 that has been secured to the LCD unit 130 and inserted into screw holes 1223 and 1224 of the front cover 120, respectively. The LCD unit 130 is thus fixed to the front cover 120.

Also, as shown in FIG. 2, the rear cover 140 is fixed to the LCD unit 130 in the following manner. The screw 191 is put through a clear hole of the concave portion 141 of the rear cover 140 and inserted into a screw hole 153 of the screw-on hardware member 150 that has been secured to the LCD unit 130 as well as the front cover 120. The screw 192 is put through a clear hole of the concave portion 142 of the rear cover 140 and inserted into a screw hole 163 of the screw-on hardware member 160 that has been secured to the LCD unit 130 as well as the front cover 120. The screws 193 and 194 are put through clear holes of the concave portion 143 and 144 of the rear cover 140 and inserted into screw holes 1732 and 1732 of the screw-on hardware member 170 that has been secured to the LCD unit 130 as well as the front cover 120. The rear cover 140 is thus fixed to the LCD unit 130 so that the LCD unit 130 is secured between the front cover 120 and the rear cover 140.

Figure 8:
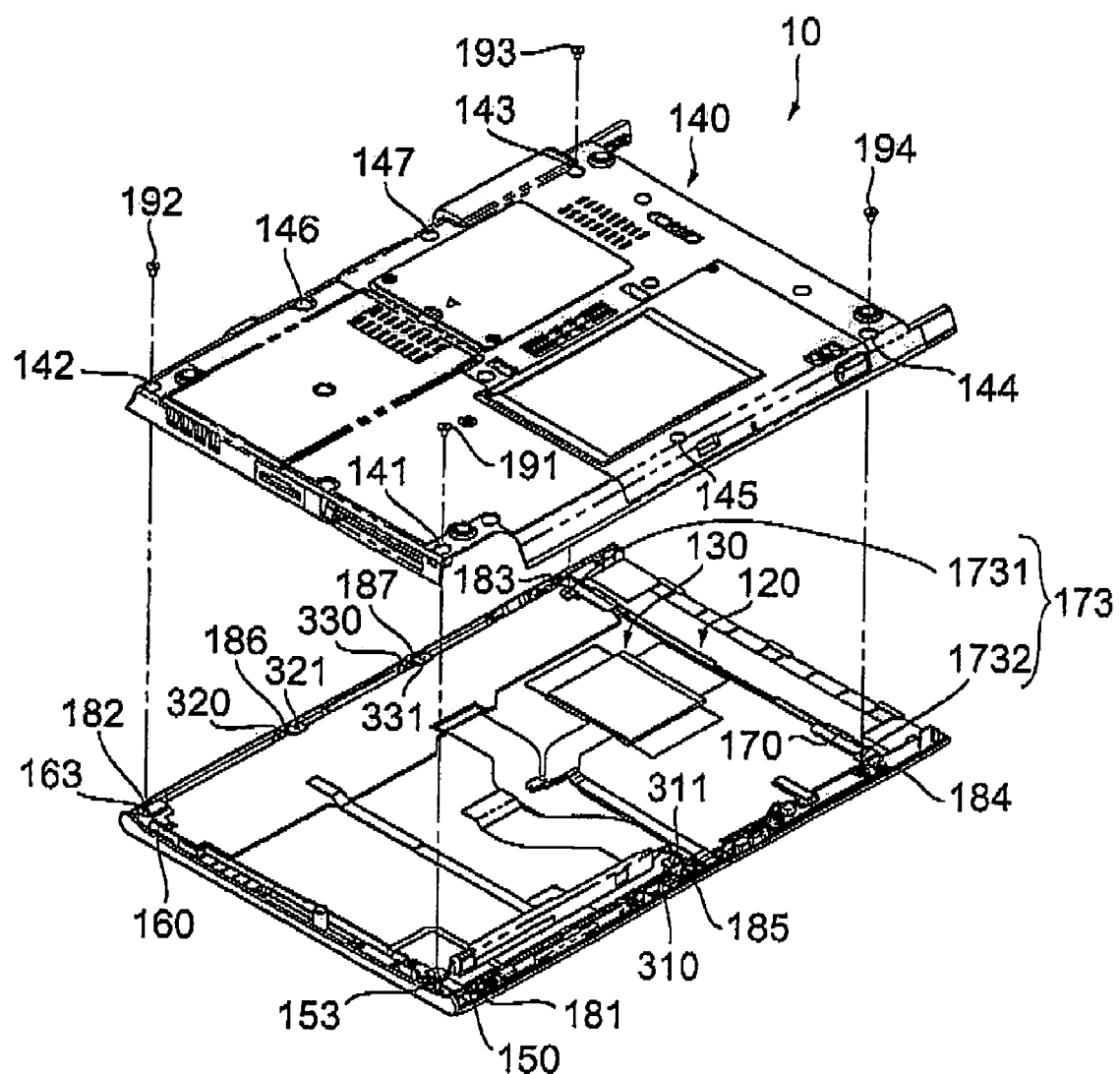
FIG. 8 is an exploded perspective view showing a rear cover and a LCD unit that has been fixed to a front cover.

FIG. 8 is an exploded perspective view showing the rear cover 140 and the LCD unit 130 that has been fixed to the front cover 120.

The screw holes 153, 163 and 173 of the respective screw-on hardware members 150, 160 and 170 for fixing the rear cover 140 to the LCD unit 130 are disposed at the respective positions where the LCD unit 130 overlaps these screw holes in the vertical direction when the screw-on hardware members 150, 160 and 170 are fixed to the LCD unit 130. By providing the screw holes 153, 163 and 173 at such positions, it is possible to shrink the area of the front cover 120 and the rear cover 140, which surrounds the outer edge of the LCD unit 130, and thus the tablet PC 10 can be reduced in size. This feature will be described later again using a comparative example.

In the present embodiment, as shown in FIG. 8, besides the screw-on hardware members 150, 160 and 170, three other screw-on hardware members 310, 320 and 330 are used for fixing the rear cover 140 to the front cover 120. The screw-on hardware members 310, 320 and 330 have clear holes through which screws 185, 186 and 187 are inserted respectively so that the screw-on hardware members 310, 320 and 330 are fixed to the front cover 120.

The screw-on hardware members 310, 320 and 330 also have screw holes 311, 321 and 331 respectively for fixing the rear cover 140 to the front cover 120. Screws (not shown) are put through clear holes 145, 146 and 147 and inserted into the screw holes 311, 321 and 331 of the screw-on hardware members 310, 320 and 330 so that the rear cover 140 is more firmly fixed to the front cover 120.

Like the screw holes 153, 163 and 173 of the screw-on hardware members 150, 160 and 170, the screw holes 311, 321 and 331 of the screw-on hardware members 310, 320 and 330 are disposed at positions where the LCD unit 130 overlaps these screw holes and thus the tablet PC 10 is reduced in size.

Figure 9:
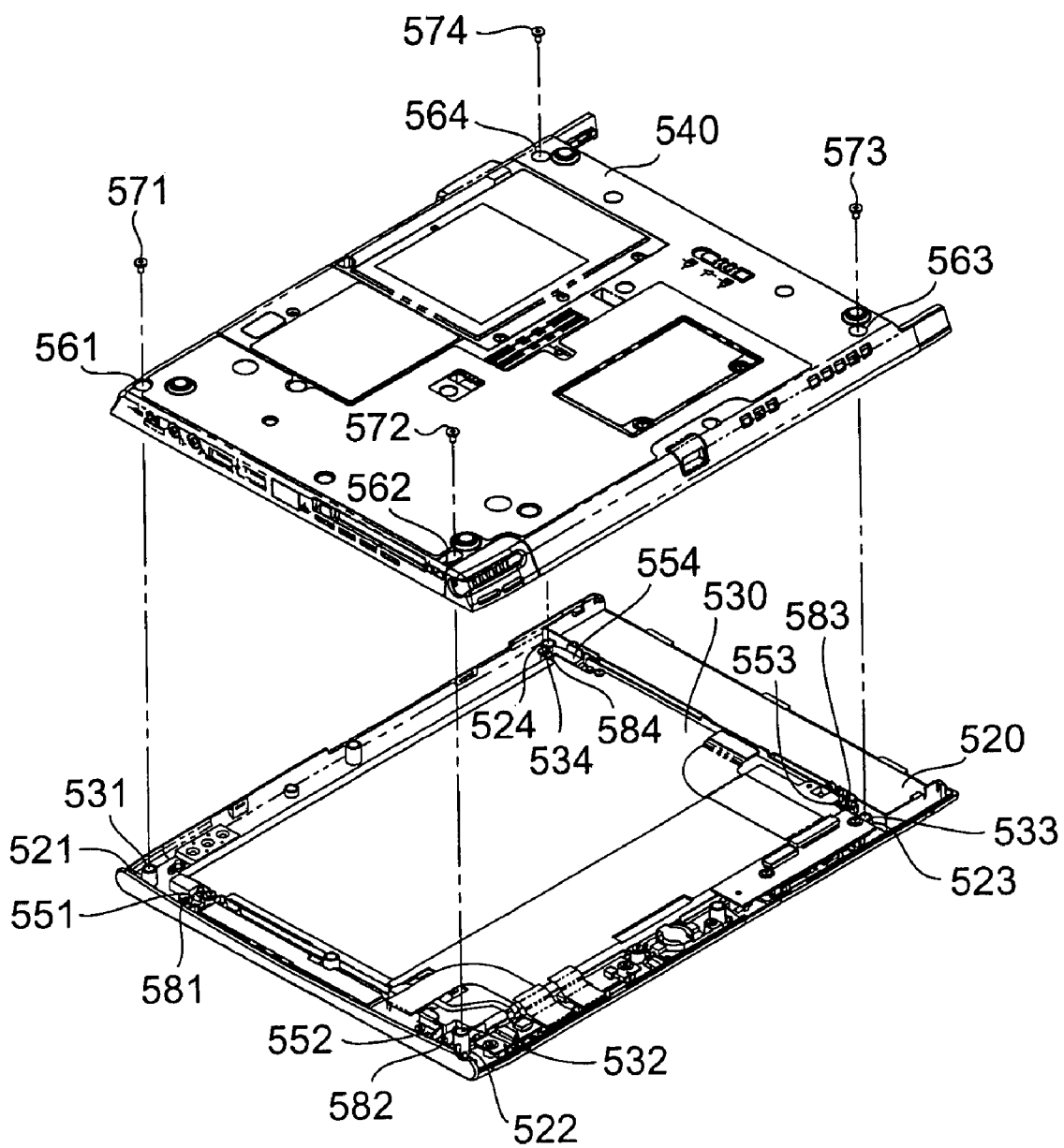
FIG. 9 is an exploded perspective view of a conventional tablet PC shown as a comparative example.

FIG. 9 is an exploded perspective view of a conventional tablet PC shown as a comparative example.

The table PC in FIG. 9 is also composed of a front cover 520, a LCD unit 530 and a rear cover 540. Like FIG. 8 showing the tablet PC 10 of the present embodiment, FIG. 9 shows a state in which the LCD unit 530 has already been fixed to the front cover 520.

Screw-on hardware members 551, 552, 553 and 554 are screwed on the LCD unit 530 and are then fixed to the front cover 520 by screws 581, 582, 583 and 584 so that the LCD unit 530 is fixed to the front cover 520.

The front cover 520 has bosses 521, 522, 523 and 524 besides the screw-on hardware members 551, 552, 553 and 554. The bosses 521, 522, 523 and 524 have screw holes 531, 532, 533 and 534 used for fixing the rear cover 540 to the front cover 520. The rear cover 540 has concave portions 561, 562, 563 and 564 provided with clear holes at positions corresponding to the screw holes 531, 532, 533 and 534 respectively. Screws 571, 572, 573 and 574 are put through the clear holes of the concave portions 561, 562, 563 and 564 and inserted into the screw holes 531, 532, 533 and 534 of the front cover 520, respectively. The front cover 520 is thus fixed to the rear cover 540. The concave portions 561, 562, 563 and 564 hide the heads of the screws 571, 572, 573 and 574 respectively, i.e. these screw heads are sunk in the concave portions 561, 562, 563 and 564 when the front cover 520 is fixed to the rear cover 540.

In the example shown in FIG. 9, the screw holes 531, 532, 533 and 534 as well as the concave portions 561, 562, 563 and 564 used for uniting the front cover 520 and the rear cover 540 are provided outside the outer edge of the LCD unit 530. Thus, the front cover 520 and the rear cover 540 are much larger than the LCD unit 530 in size.

On the contrary, in the embodiment shown in FIGS. 1 through 8, the screw holes 153, 163 and 173 for fixing the rear cover 140 to the LCD unit 130 are provided in the screw-on hardware members 150, 160 and 170 for fixing the LCD unit 130 to the front cover 120 and further, the screw holes 153, 163 and 173 are disposed at positions where the LCD unit 130 overlaps these screw holes. Thus the front cover 120 and the rear cover 140 can be reduced in size.

In the embodiment described above, the screw-on hardware members 150, 160 and 170 are screwed on the LCD unit 130 from both top and bottom as shown in FIGS. 3 and 4. If another type of LCD unit that has screw holes used for the screw fastening is adopted, the shapes of screw-on hardware members are modified to become suitable for that type of LCD unit and the screw-on hardware members are screwed on its side surface.

FIG. 10 shows the rear surface of the tablet PC 10 shown in FIG. 1.

In this rear surface, a HDD cover 117 for covering a built-in hard disk drive (referred to as HDD hereinafter) is provided.

Figure 11:
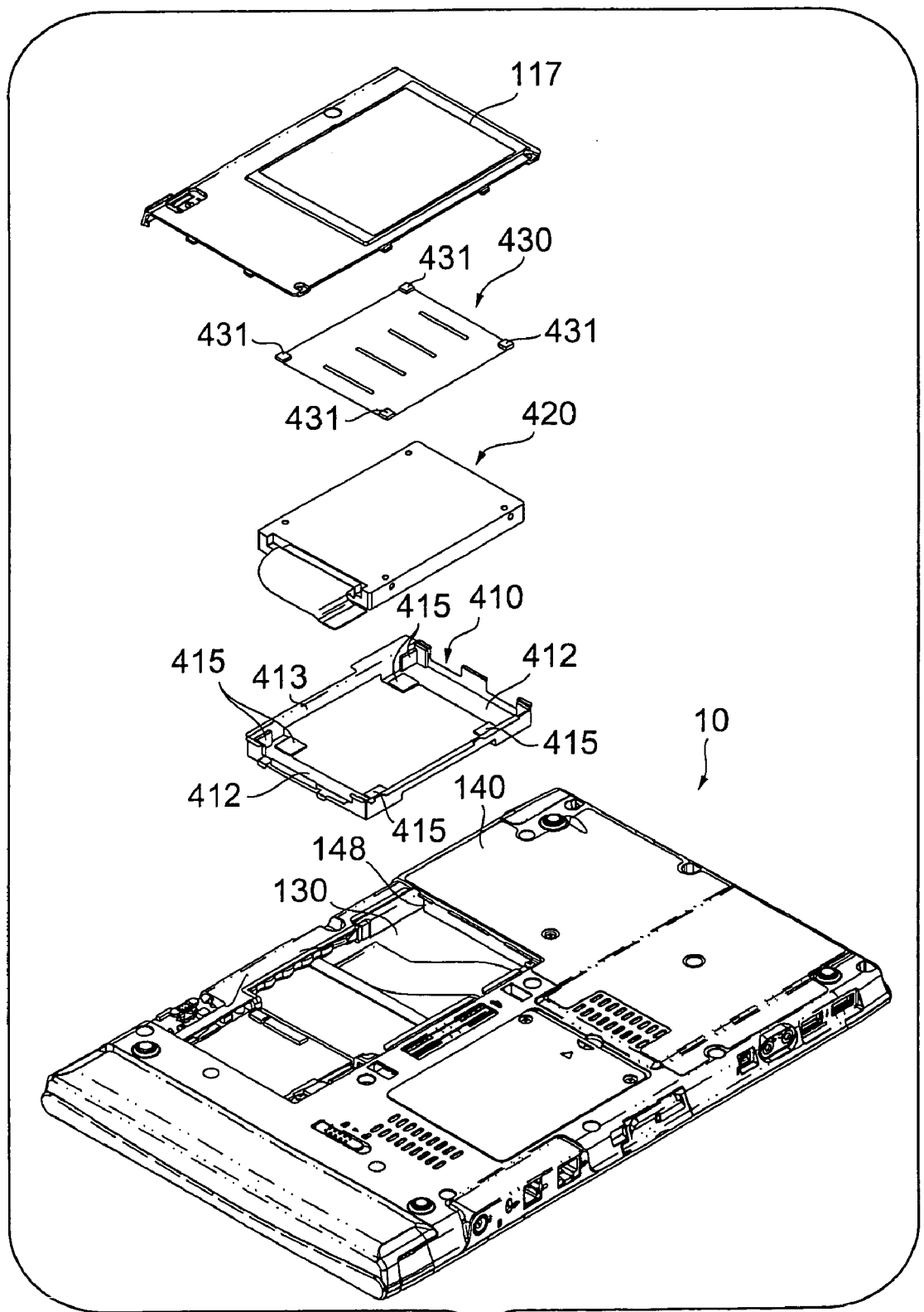
FIG. 11 is an exploded perspective view showing a HDD and components around the HDD of the tablet PC shown in FIG. 1.

FIG. 11 is an exploded perspective view showing HDD 420 and components around the HDD 420.

As shown in FIG. 11, the rear cover 140 of the tablet PC 10 has an opening 148 into which the HDD 420 is inserted.

If the HDD 420 is placed on the LCD. 130 being exposed through the opening 148, the weight of the HDD 420 is put on the LCD unit 130, which causes disturbances in displays and failures. For this reason, the HDD 420 needs to be inserted into the opening 148 without applying the weight on the LCD unit 130.

A box-shaped plate member 410 made of stainless thin plate is provided to solve such a problem. The plate member 410 is inserted into the opening 148 and supported by the edge of the opening 148. The HDD 420 is inserted into the plate member 410, a buffer member 430 is placed on the HDD 420, and the HDD cover 117 is fixed to the rear cover 140 over the buffer member 430.

Figure 12:
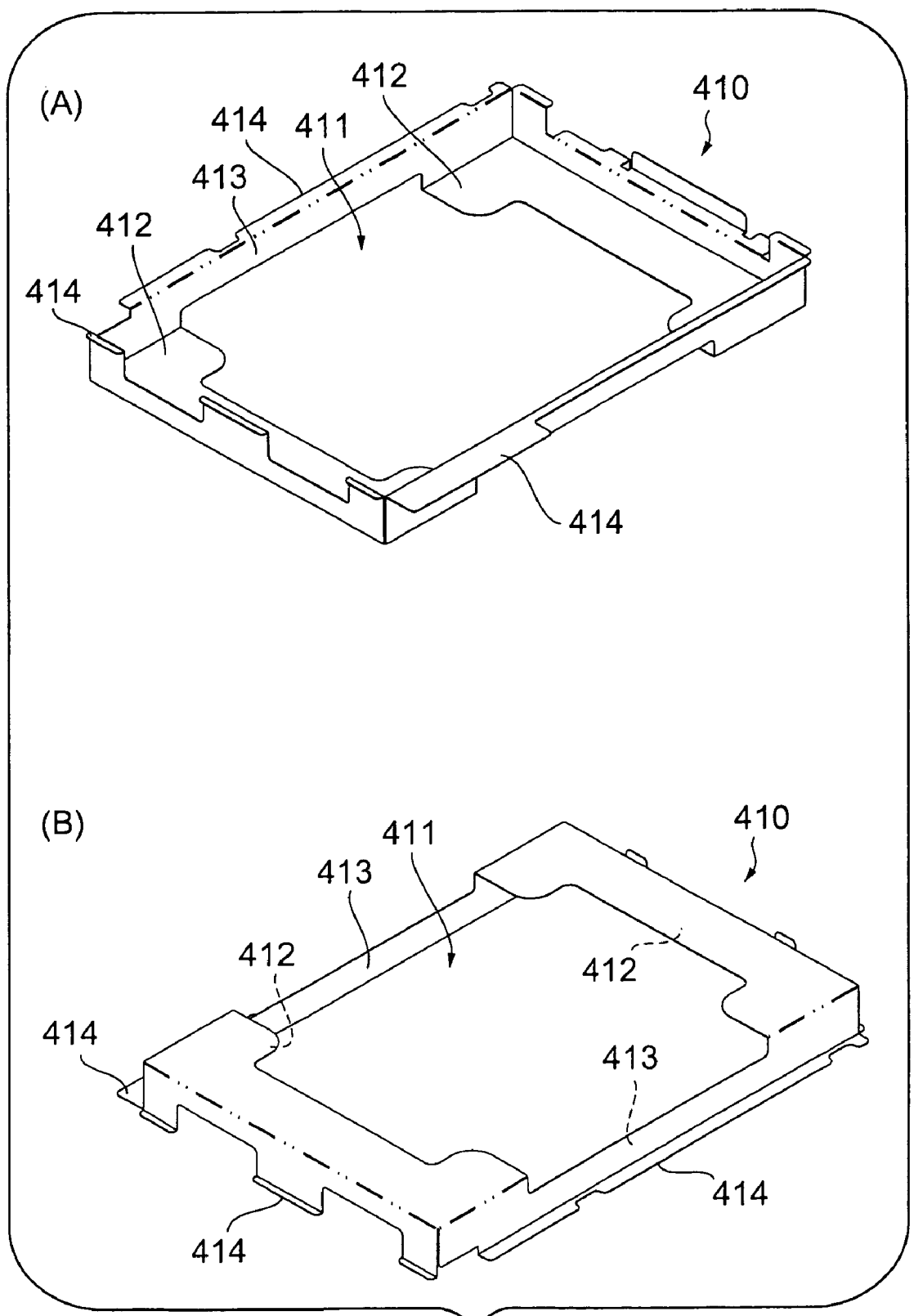
FIG. 12 is a perspective view of a plate member.

FIG. 12 is a perspective view of the plate member 410, in which part (A) of FIG. 12 illustrates the surface for receiving the HDD 420 (see FIG. 11) and part (B) of FIG. 12 illustrates the rear surface.

Figure 13:
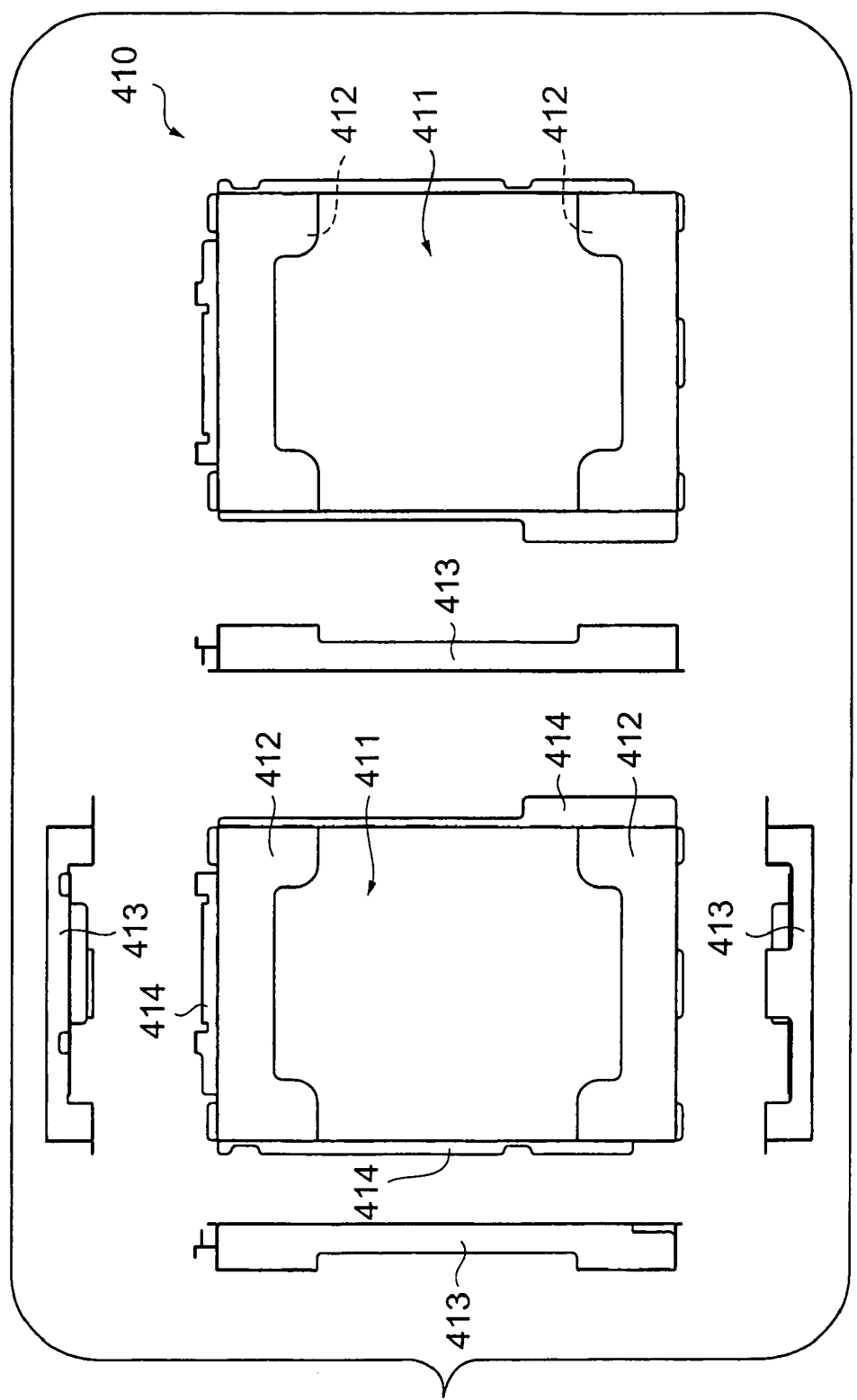
FIG. 13 is a six-view drawing of a plate member.

FIG. 13 is a six-view drawing of the plate member 410.

The plate member 410 is shaped like a box without a top surface and has an opening 411 in the center of the bottom. The plate member 410 is also provided with support surfaces 412 for supporting the HDD 420 (see FIG. 11) and defining the opening 411.

The plate member 410 also has walls 413 supported by the bottom and flanges 414 projecting outward from the edge of the walls 413. When the plate member 410 is fit into the opening 148 shown in FIG. 1, the flanges 414 rest on the edge of the opening 148 so that the plate member 410 is supported by the edge of the opening 148.

Figure 14:
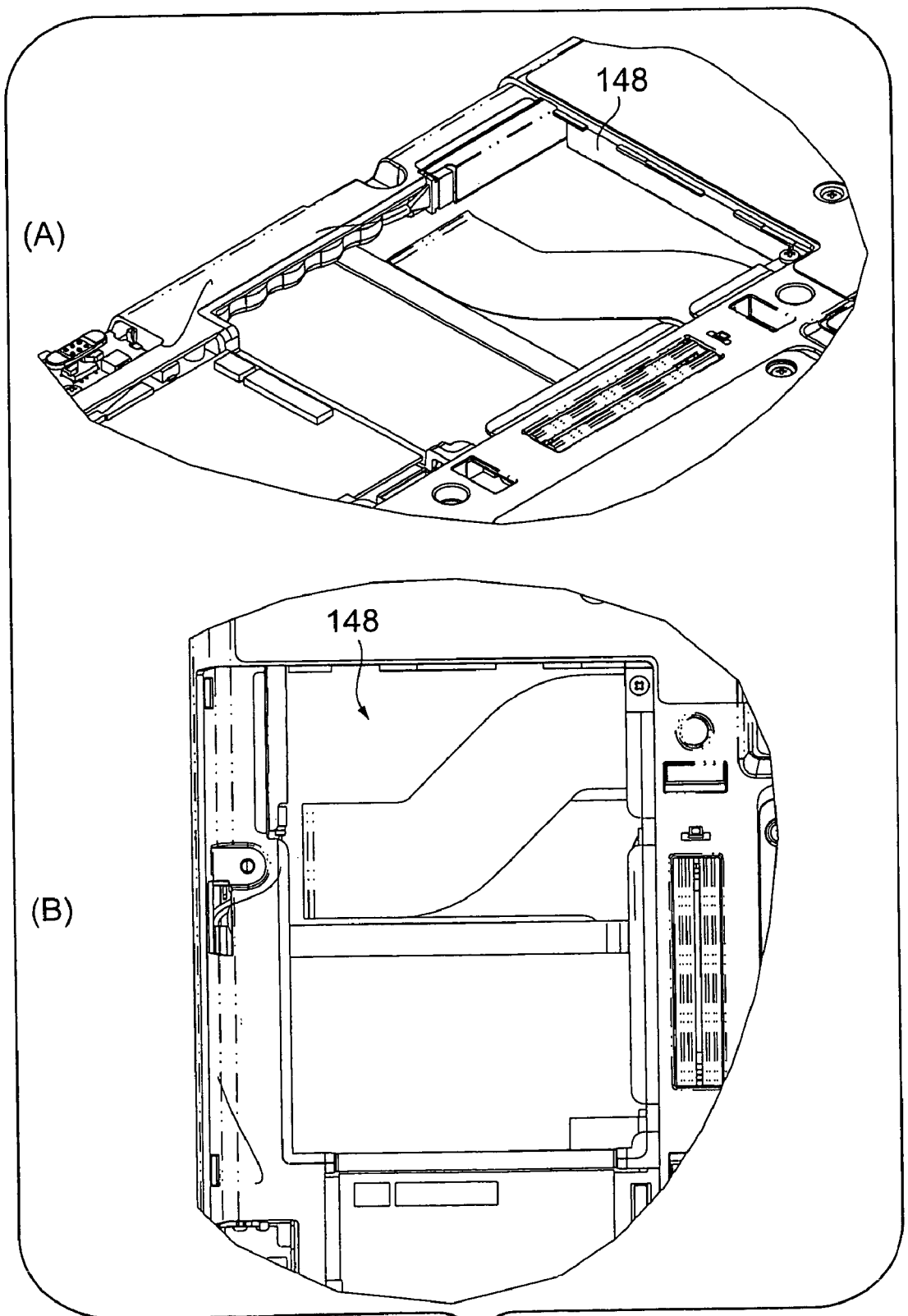
FIG. 14 is a view showing an opening shown in FIG. 11, in which part (A) is a perspective view and part (B) is a plan view thereof.
Figure 15:
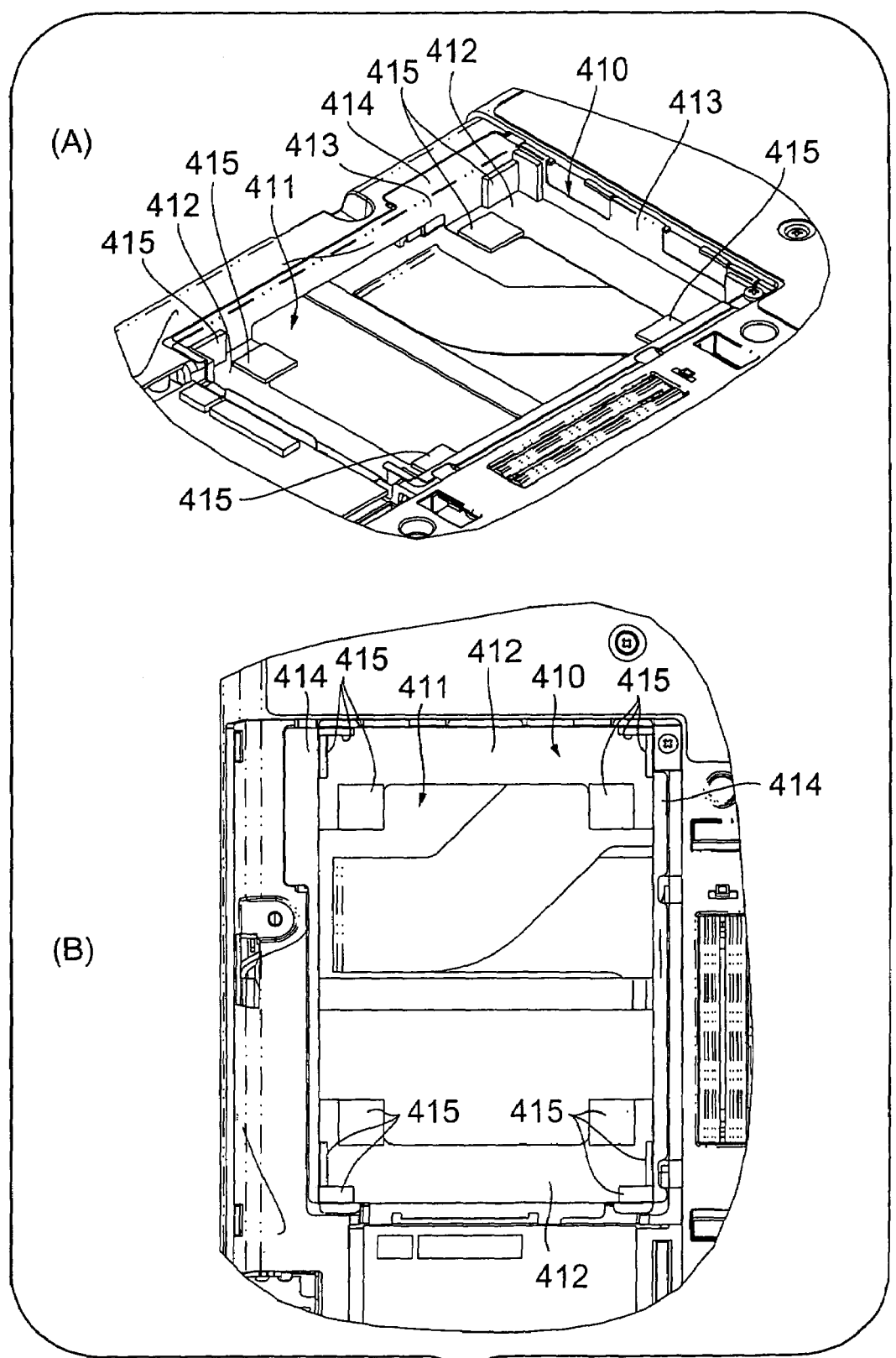
FIG. 15 a view showing a plate member being fit into an opening, in which part (A) is a perspective view and part (B) is a plan view thereof.

FIG. 14 illustrates the opening 148 shown in FIG. 11, in which part (A) and part (B) are a perspective view and a plan view of the opening 148 respectively. FIG. 15 illustrates the plate member 410 being fit into the opening 148, in which part (A) and part (B) are a perspective view and a plan view thereof respectively.

The plate member 410 is easily and elastically deformable because it is made of stainless thin plate and has the opening 411. The plate member 410 not only supports the HDD 420 but also protects it from shocks by functioning as a buffer material. The HDD 420 incorporates a hard disk therein (not shown) and has a structure in which the hard disk is rotated and accessed by a magnetic head disposed close to the hard disk. Thus it is vulnerable to shocks and needs to be sufficiently surrounded by a buffer material. In the present embodiment, the plate member 410 itself functions as a buffer material and thus it is possible to make buffer materials except the plate member 410 thinner.

As shown in FIGS. 11 and 15, buffer materials 415 made of rubber are affixed to the support surfaces 412 and the walls 413. The HDD 420 is inserted into and supported by the plate member 410 via the buffer materials 415.

The buffer member 430 is then placed on the HDD 420 that is inserted into the plate member 410.

As shown in FIG. 11, buffer materials 431 made of rubber are affixed to all corners of the buffer member 430. The buffer member 430 is covered by the HDD cover 117 via the buffer materials 431. The buffer materials 431 protect the HDD 420 from shocks received by the HDD cover 117.

Figure 16:
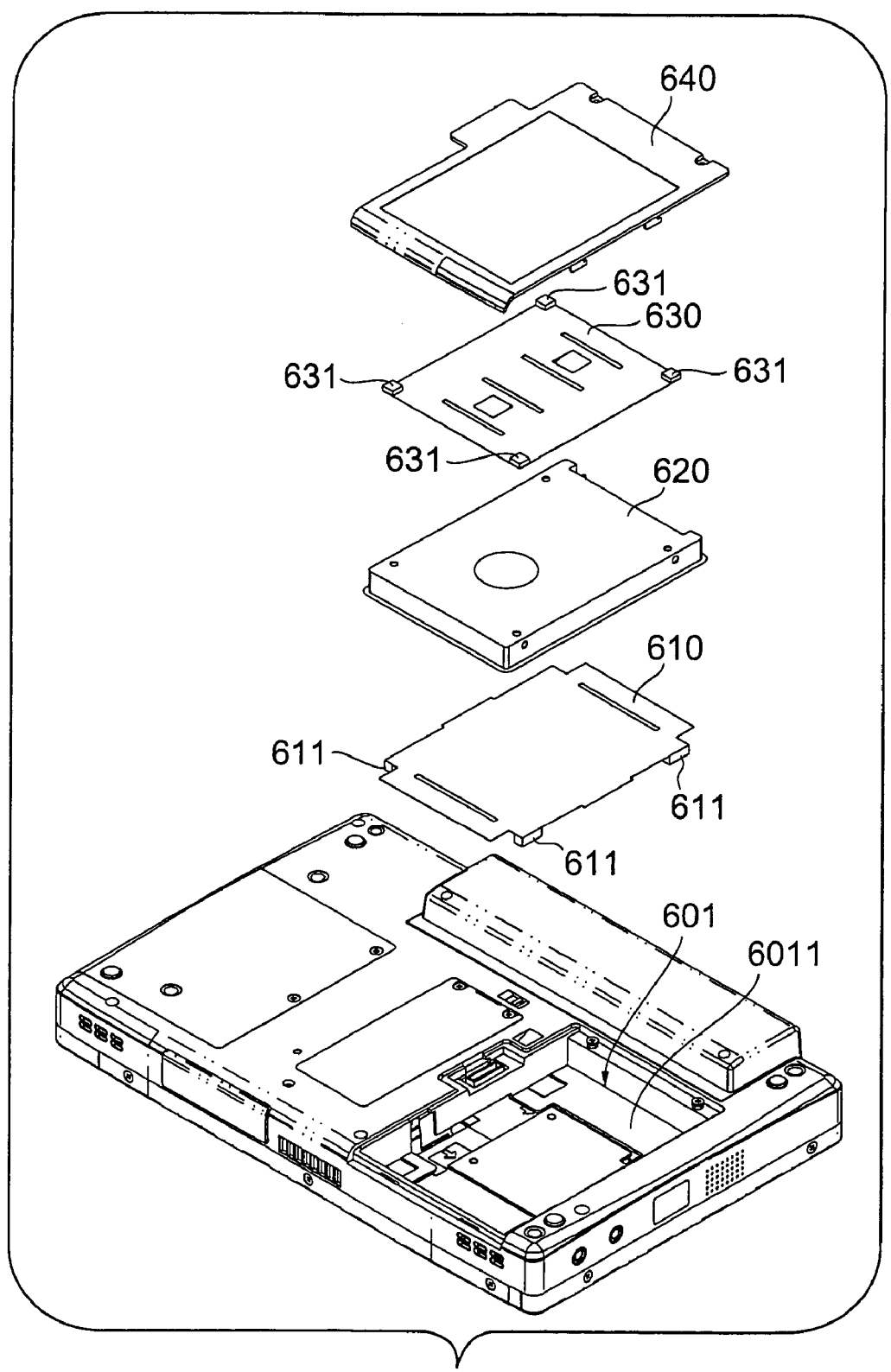
FIG. 16 is an exploded perspective view of a conventional tablet PC shown as a comparative example.

FIG. 16 is an exploded perspective view of a conventional tablet PC shown as a comparative example.

The table PC shown in FIG. 16 also has a three-layer structure that is basically composed of a front cover, a LCD unit, and a rear cover. The rear cover has an opening 601 into which a HDD 620 is inserted. In a bottom 6011 of the opening 601, there is provided a hard plate that prevents the LCD unit from receiving the weight of the HDD 620.

In the opening 601, a buffer member 610 made of plastic and having buffer materials 611 affixed thereto, the HDD 620, and another buffer member 630 having buffer materials 631 affixed thereto are placed in this order. Then, a HDD cover 640 is fixed to the rear cover over the buffer member 630.

In a structure in this example, the hard plate to fill the bottom 6011 of the opening 601 is required and it is necessary to use thick materials as the buffer materials 611 and 631 so that shocks can be absorbed only by these materials. Also, it is necessary to use a thick and less flexible plate as the buffer member 610. Accordingly, this structure requires quite large thickness as a whole, i.e. the size of the table PC becomes large in thickness, which does not satisfy the demand for miniaturization.

Figure 17:
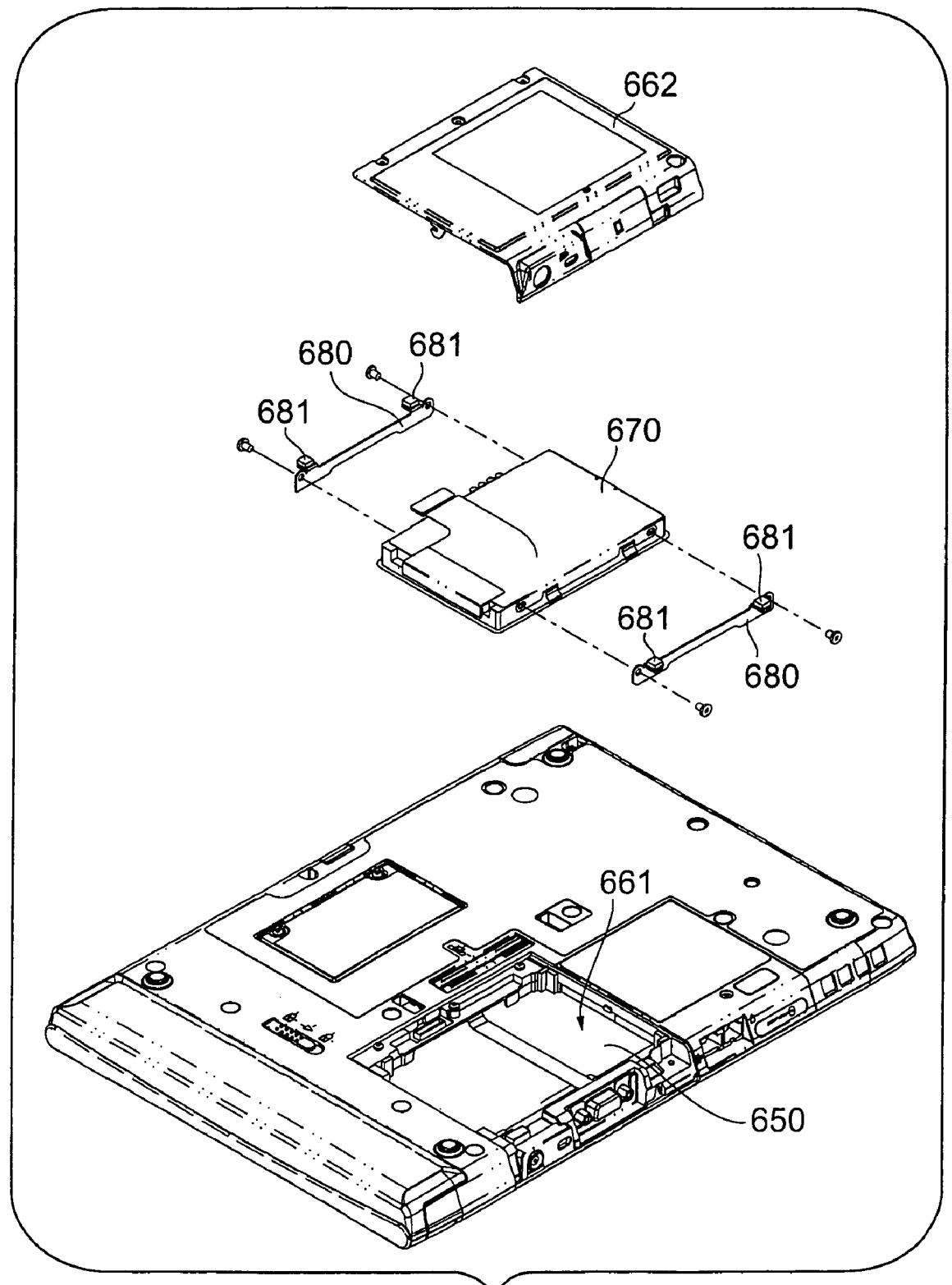
FIG. 17 is an exploded perspective view of a conventional tablet PC shown as another comparative example.

FIG. 17 is an exploded perspective view of a conventional tablet PC shown as another comparative example.

The table PC shown in FIG. 17 also has a three-layer structure that is composed of a front cover, a LCD unit, and a rear cover. The rear cover has an opening 661 into which a HDD 670 is inserted, and a LCD unit 650 can bee seen through the opening 661. There, it is necessary to avoid applying the weight of the HDD 670 to the LCD unit 650. Thus, plate members 680 having buffer materials 681 affixed thereto are fixed on both sides of the HDD 670 so that the HDD 670 is supported by the sides without applying its weight to the LCD unit 650 when the HDD 670 is inserted into the opening 661. After the HDD 670 is placed in the opening 611, the opening 611 is covered by a HDD cover 662.

In the example shown in FIG. 17, the HDD 670 is supported at both sides thereof so that its size in thickness can be reduced, which satisfies the demand for small thickness. However, since the plate members 680 are fixed on both sides of the HDD 670 so as to support the HDD 670, a substantially large space around the opening 661 is required to support the plate members 680. Such a structure does not satisfy the demand for miniaturization.

In the embodiment of the present invention described by reference to FIGS. 11 through 15, there is no need to provide a space much larger than the overall size of the HDD 420 around the opening 148. In addition, since the thin plate member 410 is provided and its elasticity is utilized, the buffer materials 415 and 431 are thin and thus the size of the table PC 10 is small in thickness. Therefore, the present embodiment provides a structure that satisfies the demand for both miniaturization and small thickness.

Figure 18:
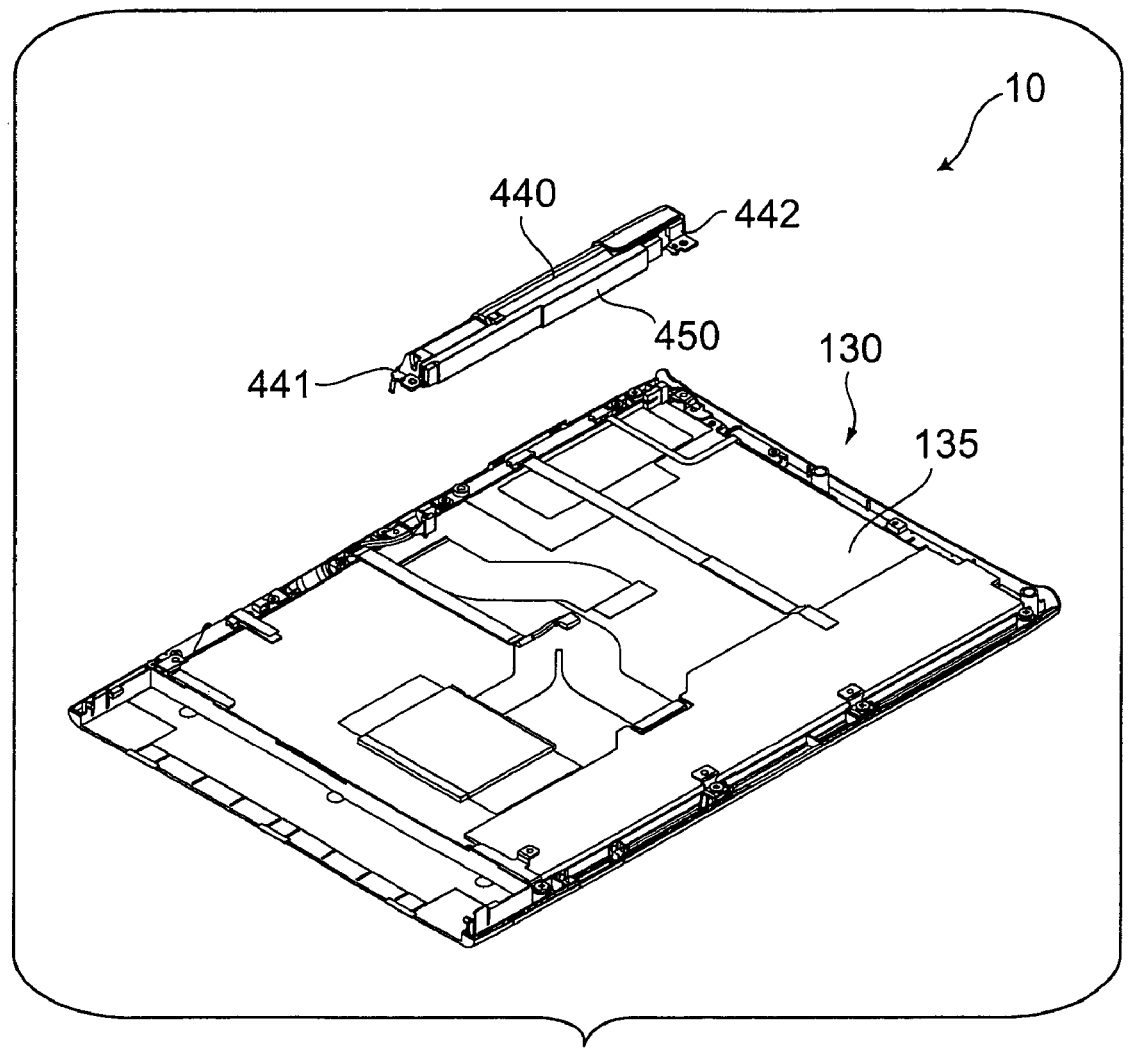
FIG. 18 is an exploded perspective view of the LCD unit and a pen case composing the tablet PC shown in FIG. 1.

FIG. 18 is an exploded perspective view of the LCD unit and the pen case composing the tablet PC 10 shown in FIG. 1.

In FIG. 18, the rear surface of the LCD unit 130 (see FIGS. 3 and 4) is illustrated. Above the LCD unit 130, the pen case 440 to be disposed on the rear surface of the LCD unit 130 and an inverter 450 supported by the pen case 440 are illustrated.

The pen case 440 is used to house and keep the pen 13 shown in FIG. 1, and the pen 13 can be freely inserted into and pulled from the pen case 440. The inverter 450 is used to supply power to the LCD unit 130 by generating the power for turning on a backlight of the LCD unit 130 upon receipt of the power from the batter unit 12.

Figure 19A:
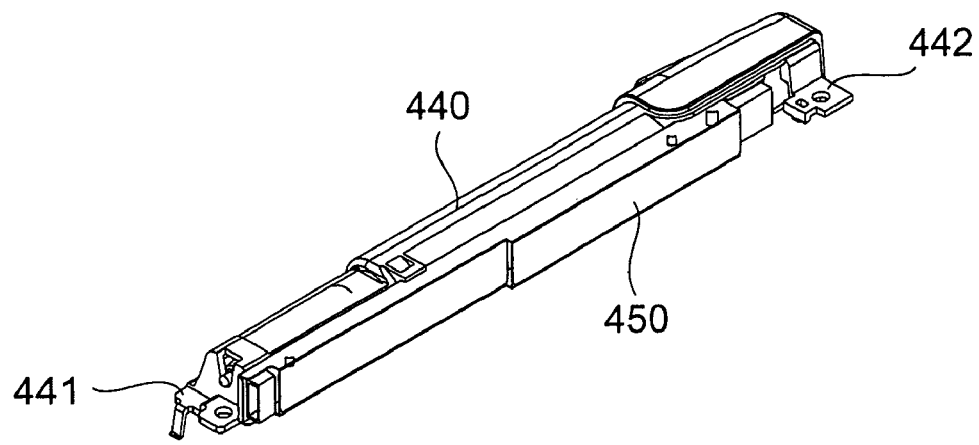
FIG. 19(A) is a perspective view of a pen case.
Figure 19B:
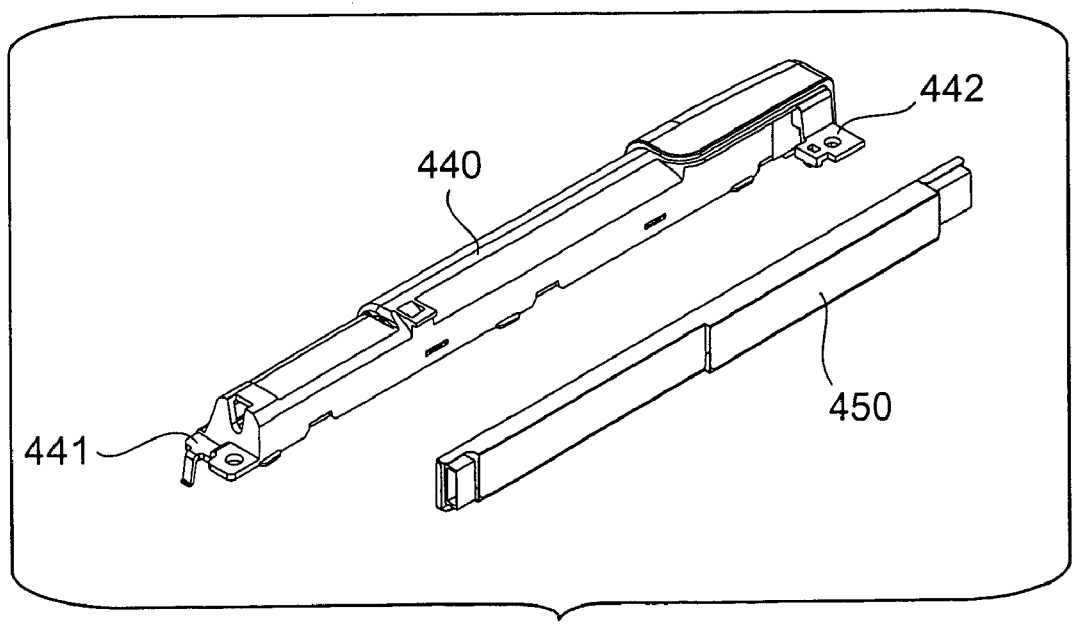
FIG. 19(B) is a perspective view of an inverter.

FIG. 19(A) and FIG. 19(B) are perspective views of the pen case 440 and the inverter 450 respectively. FIG. 19(A) illustrates a state in which the inverter 450 is fixed to the pen case 440, and FIG. 9(B) illustrates a state in which the inverter 450 and the pen case 440 are separate.

On both sides of the pen case 440 in the longitudinal direction, pen-case fixing members 441 and 442 for fixing the pen case 440 are provided. The pen-case fixing members 441 and 442 are fixed to the screw-on hardware members 310 and 150 shown in FIG. 8 so that the pen case 440 is fixed on the rear surface 135 of the LCD unit 130 while retaining the inverter 450.

As shown in FIGS. 18 and 19(A), the inverter 450 is supported by the pen case 440 and arranged on the rear surface 135 of the LCD unit 130. On the rear surface 135 of the LCD unit 130, there is provided a shield plate for preventing electromagnetic noise. Although the inverter 450 is a kind of noise source, the shield plate prevents noise generated by the inverter 450 from affecting the display of the LCD unit 130 and the detection of positions pointed by the pent 13.

Figure 20:
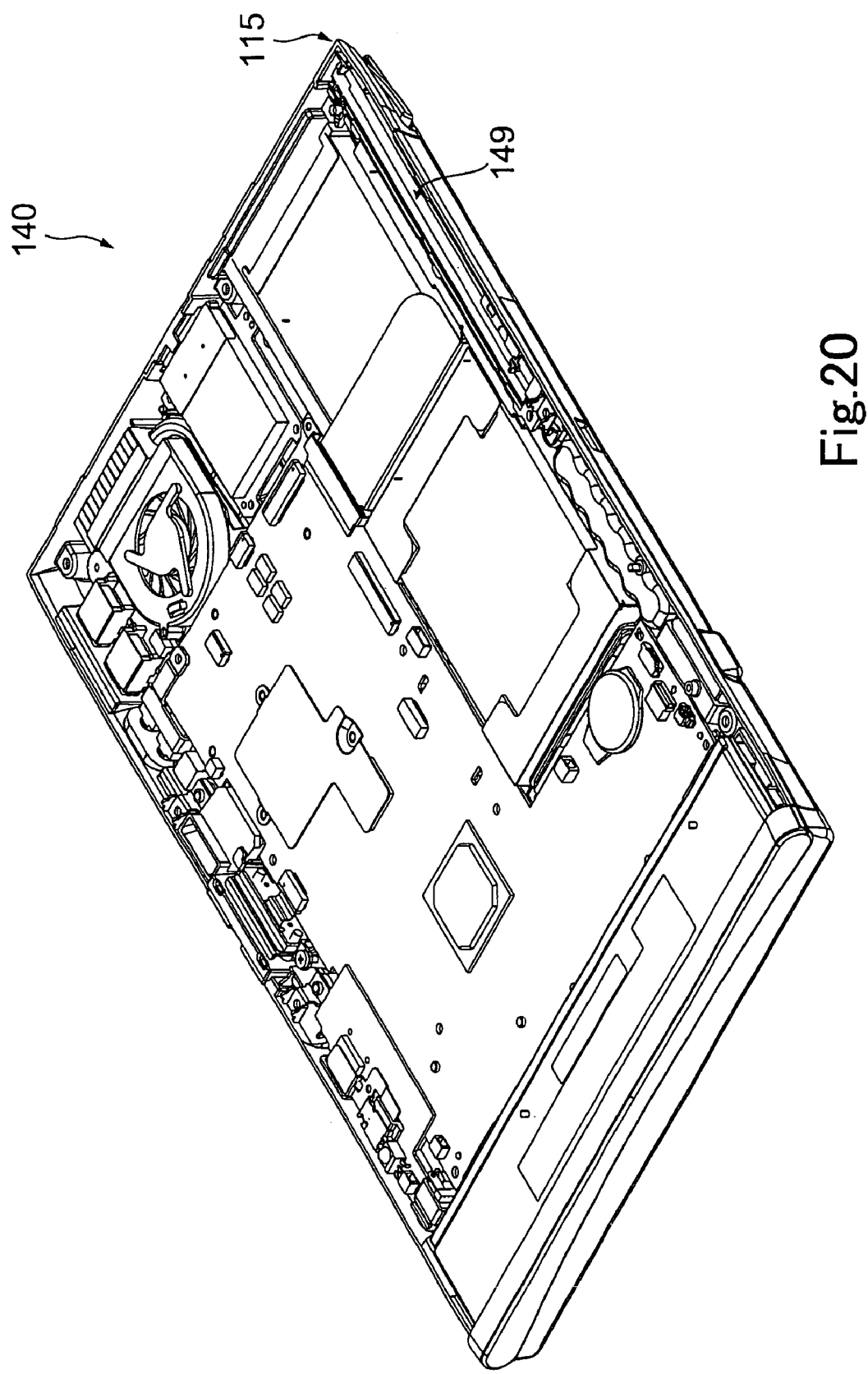
FIG. 20 is a perspective view of a rear cover.

FIG. 20 is a perspective view of the rear cover 140.

FIG. 20 illustrates the inside of the rear cover 140, which faces the rear surface 135 of the LCD unit 130.

The pen case 440 and the inverter 450 shown in FIGS. 18 and 19 are housed in a housing area 149 in the rear cover 140. The pen 13 is inserted into or pulled from the pen case 440 through the pen opening 115 (see FIG. 1 also).

Figure 21:
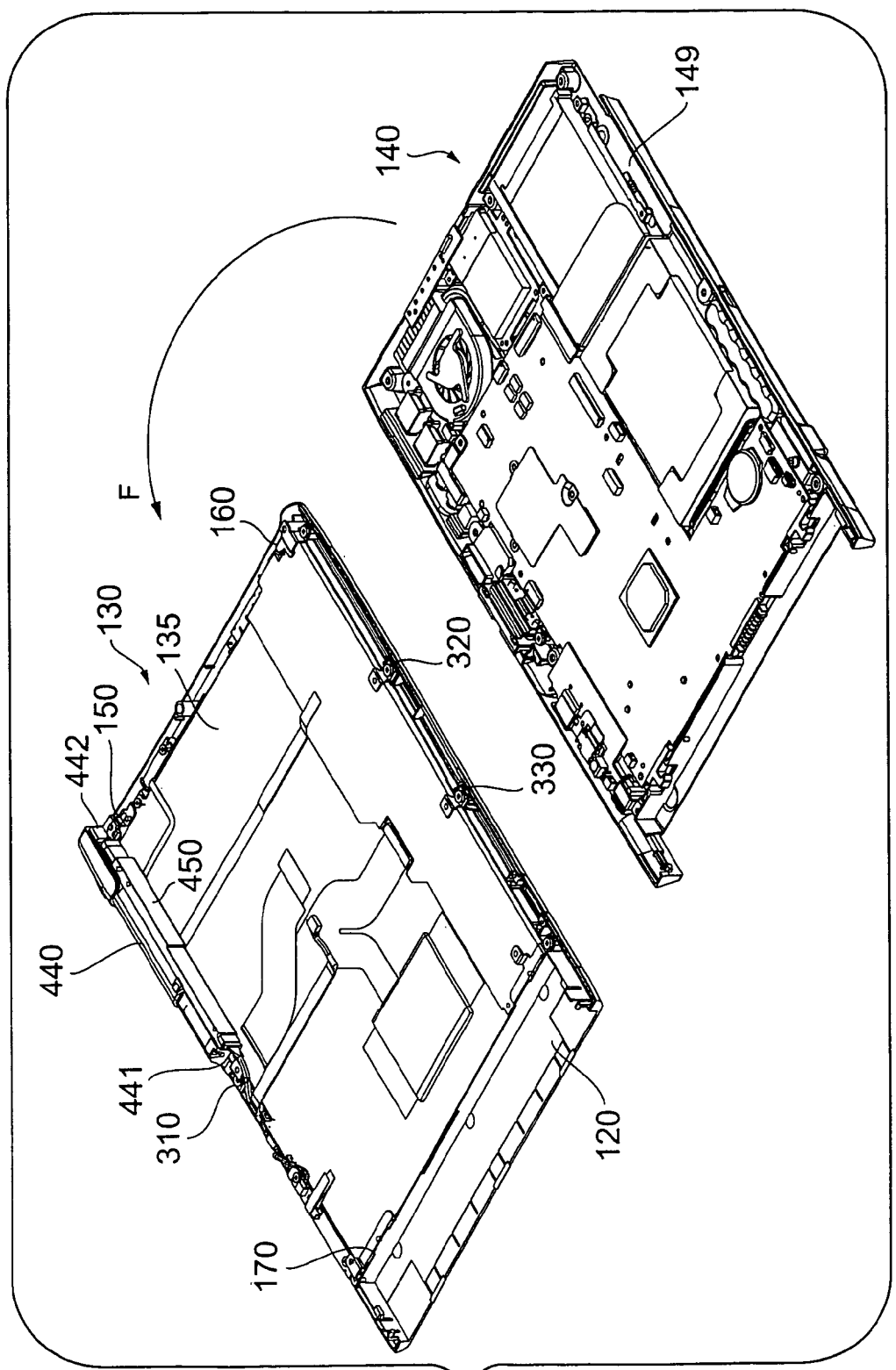
FIG. 21 is a perspective view of a rear cover and a LCD unit being fixed to a front cover.

FIG. 21 is a perspective view of the rear cover 140 and the LCD unit 130 being fixed to the front cover 120.

The pen-case fixing members 441 and 442 being disposed on both sides of the pen case 440 are fixed to the screw-on hardware members 310 and 150, and the pen case 440 retaining the inverter 450 is arranged on the rear surface 135 of the LCD unit 130.

The rear cover 140 is placed on the rear surface 135 in the direction shown by an arrow F. The pen case 440 and the inverter 450 are housed in the housing area 149.

The pen case 440 can be arranged on the rear cover 140. However, the inverter 450 cannot be arranged on the rear cover 140 because it needs to be electrically connected to the LCD unit 130. If the inverter 450 is arranged on the rear cover 140, there arises a problem with respect to wiring to the LCD unit 130 when the rear cover 140 is fixed to the LCD unit 130. Thus, the inverter 450 needs to be arranged on the LCD 130 in a state where the rear cover 140 and the LCD unit 130 are separated as shown in FIG. 2. Accordingly, in the present embodiment, the pen case 440 is arranged on the LCD unit 130 and the inverter 450 is supported by the pen case 440.

The inverter 450 is placed at a position where it overlaps the rear surface of the LCD unit 130 and thus the tablet PC is small and satisfies the demand for miniaturization.

Figure 22:
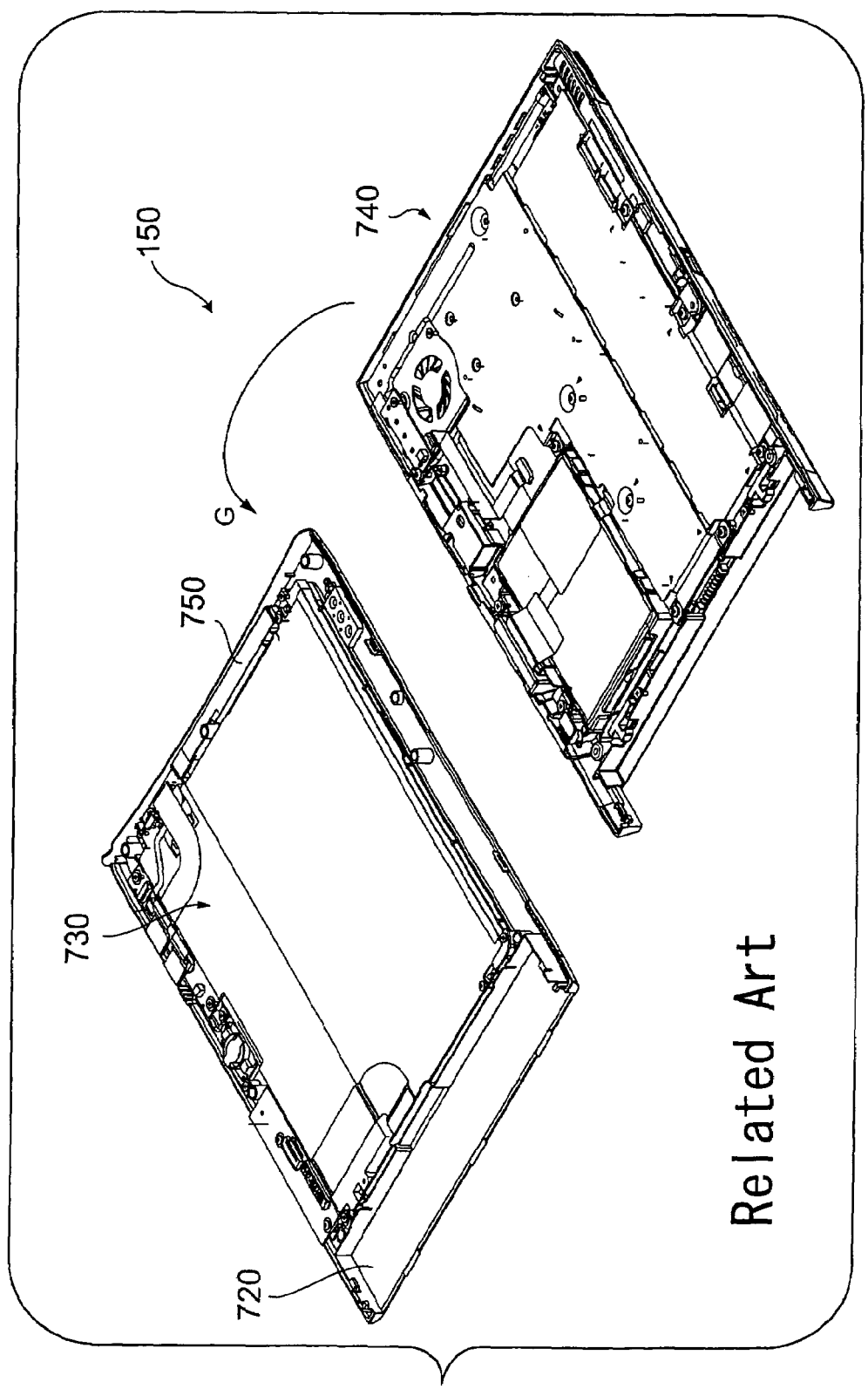
FIG. 22 is an exploded perspective view of a conventional tablet PC shown as a comparative example.

FIG. 22 is an exploded perspective view of a conventional tablet PC shown as a comparative example.

Like FIG. 21 showing the present embodiment, FIG. 22 shows a LCD unit 730 being fixed on a front cover 720 and the inside of a rear cover 740.

In the comparative example shown in FIG. 22, an inverter 750 is arranged beside the LCD unit 730 and fixed on the front cover 720.

In this case, even if there is an empty space in the rear cover 740, it remains dead, and the front cover 740 needs a space large enough to accommodate the LCD unit 730 and the inverter 750 arranged side by side. As a result, the tablet PC is large in size. In addition, the rear cover 740 incorporates therein a CPU and various components such as circuit components for realizing the function of operating as a personal computer. Since the rear cover 740 is placed on the LCD unit 730 in the direction shown by an arrow G, though the inverter 750 is not arranged on the rear surface of the LCD unit 730, there is provided a shield plate to prevent noise generated by various circuit components incorporated in the rear cover 740 from affecting the display of the LCD unit 730 and the detection of positions pointed by a pen. However, since the inverter 750 is arranged beside the LCD unit 730, noise generated by the inverter 750 cannot be shielded by the shield plate alone and thus other shield members are arranged on walls etc. surrounding the inverter 750. Accordingly, the structure shown in FIG. 22 not only fails to satisfy the demand for miniaturization but fails to prevent noise. Further, since such a structure requires shield members in addition to the shield plate arranged on the rear surface of the LCD unit 730, the number of components and the cost are increased.

On the contrary, in the present embodiment, as shown in FIG. 21 for example, the inverter 450 is arranged on the LCD unit 130 and housed in the housing area 149 that is an empty space in the rear cover 140. Therefore, the present embodiment is successful not only in miniaturization but also in preventing noise.

What is claimed is:

1. An electronic apparatus including:
   a plate-shaped display panel that has a screen on a front surface thereof;
   a first cover that has a display window at a position facing the screen and covers one surface of the display panel; and
   a second cover that covers the other surface of the display panel so as to house the display panel in cooperation with the first cover,
   the electronic apparatus comprising:
   a fastening member that has a first hole via which the fastening member is fixed to a periphery of the display panel, a second hole via which the fastening member is fixed to the first cover, and a third hole via which the fastening member is fixed to the second cover,
   wherein the fastening member has the third hole at a position where the third hole overlaps the display panel when the fastening member is fixed to the display panel via the first hole, and
   wherein the third hole is formed independently of the second hole.

2. An electronic apparatus according to claim 1 wherein the third hole is a screw hole, and the second cover is fixed to the fastening member by a screw inserted into the screw hole.

3. An electronic apparatus according to claim 1, wherein the fastening member is a hardware member.

4. An electronic apparatus according to claim 1, has an information processing function including an image display processing function for the screen.

5. An electronic apparatus including:
a plate-shaped display panel that has a screen on a front surface thereof;
a first cover that has a display window at a position facing the screen and covers one surface of the display panel; and
a second cover that covers the other surface of the display panel so as to house the display panel in cooperation with the first cover, the electronic apparatus comprising:
an fastening member that has a first hole via which the fastening member is fixed to the first cover, and a second hole via which the fastening member is fixed to the second cover,
wherein the fastening member has the second hole at a position where the second hole overlaps the display panel when the display panel is fixed to the first cover and the fastening member is fixed to the first cover.

6. An electronic apparatus according to claim 5 wherein the fifth hole is a screw hole, and the second cover is fixed to the fastening member by a screw inserted into the screw hole.

7. An electronic apparatus according to claim 5, wherein the fastening member is a hardware member.

8. An electronic apparatus according to claim 5, has an information processing function including an image display processing function for the screen.

9. An electronic apparatus including:
a plate-shaped display panel that has a screen on a front surface thereof;
a first cover that has a display window at a position facing the screen and covers one surface of the display panel; and
a second cover that covers the other surface of the display panel so as to house the display panel in cooperation with the first cover, wherein:
the second cover is provided with an opening and comprises:
a box-shaped plate member that has an open space in a center of a bottom thereof and is fit into the opening so as to be supported by an edge of the opening; and
a disk unit that drives a disk type of recording medium and is disposed in the opening in such a manner that the disk unit is fit into the plate member and supported by a periphery of the bottom of the plate member.

10. An electronic apparatus according to claim 9, wherein the disk unit includes a hard disk therein and drives the hard disk.

11. An electronic apparatus according to claim 9, has an information processing function including an image display processing function for the screen.

12. An electronic apparatus including:
a plate-shaped display panel that has a screen on a front surface thereof;
a first cover that has a display window at a position facing the screen and covers one surface of the display panel; and
a second cover that covers the other surface of the display panel so as to house the display panel in cooperation with the first cover,
the electronic apparatus comprising:
a power converter that converts, upon receipt of power, the power into power to be supplied to the display panel,
wherein the power converter is fixed to the first cover and disposed at a position where the power converter overlaps the display panel, and wherein the display panel includes a function of accepting pen input by detecting a position touched by or approached by a pen,
and the electronic apparatus further comprises a pen case that is fixed to the first cover and disposed at a position where the pen case overlaps a rear surface of the display panel, and
the power converter is fixed to the pen case and fixed to the first cover via the pen case.

13. An electronic apparatus according to claim 12, wherein the power converter is an inverter that supplies power for backlighting the screen.

14. An electronic apparatus according to claim 12, has an information processing function including an image display processing function for the screen.

15. An electronic apparatus including:
a plate-shaped display panel that has a screen on a front surface thereof;
a first cover that has a display window at a position facing the screen and covers one surface of the display panel; and
a second cover that has an information processing function including an image display processing function for the screen and covers the other surface of the display panel so as to house the display panel in cooperation with the first cover,
the electronic apparatus comprising:
a fastening member that has a first hole via which the fastening member is fixed to a periphery of the display panel, a second hole via which the fastening member is fixed to the first cover, and a third hole via which the fastening member is fixed to the second cover, wherein
the second cover is fixed to the fastening member by a screw via the third hole, and wherein the third hole is formed independently of the second hole.

16. An electronic apparatus including:
a plate-shaped display panel that has a screen on a front surface thereof;
a first cover that has a display window at a position facing the screen and covers one surface of the display panel; and
a second cover that has an information processing function including an image display processing function for the screen and covers the other surface of the display panel so as to house the display panel in cooperation with the first cover,
the electronic apparatus comprising:
a fastening member that has a first hole via which the fastening member is fixed to a periphery of the display panel, a second hole via which the fastening member is fixed to the first cover, and a third hole via which the fastening member is fixed to the second cover,
wherein the fastening member has the third hole at a position where the third hole overlaps a square area including the display panel and the fastening member when the fastening member is fixed to the display panel via the first hole, and wherein the third hole is formed independently of the second hole.

17. An electronic apparatus including:

a plate-shaped display panel that has a screen on a front surface thereof;

a first cover that has a display window at a position facing the screen and covers one surface of the display panel; and a second cover that covers the other surface of the display panel so as to house the display panel in cooperation with the first cover, the electronic apparatus comprising:

a fastening member that has a fourth first hole via which the fastening member is fixed to the first cover, and a second hole via which the fastening member is fixed to the second cover, wherein the fastening member has the second hole at a position where the second hole overlaps a square area including the display panel and the fastening member when the display panel is fixed to the first cover and the fastening member is fixed to the first cover.

* * * * *